(12) United States Patent
Ichikawa et al.

(10) Patent No.: US 7,777,429 B2
(45) Date of Patent: Aug. 17, 2010

(54) DISCHARGE LAMP LIGHTING CIRCUIT

(75) Inventors: Tomoyuki Ichikawa, Shizuoka (JP);
Takao Muramatsu, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 419 days.

(21) Appl. No.: 11/962,199

(22) Filed: Dec. 21, 2007

(65) Prior Publication Data

US 2008/0157692 A1 Jul. 3, 2008

(30) Foreign Application Priority Data

Dec. 27, 2006 (JP) .............................. 2006-352776

(51) Int. Cl.
*G05F 1/00* (2006.01)
(52) U.S. Cl. .................. 315/308; 315/209 R; 315/177; 315/291
(58) Field of Classification Search ................. 315/177, 315/209 R, 219, 220, 221, 222, 224, 225, 315/226, 246, 277, 279, 282, 283, 287, 291, 315/299, 300, 301, 302, 307, 308, 362; 323/304, 323/305, 306, 307, 308, 316, 355, 358, 361, 323/362, 363, 364, 365
See application file for complete search history.

(56) References Cited

U.S. PATENT DOCUMENTS

2007/0052371 A1 * 3/2007 Fukuda et al. ............... 315/291

FOREIGN PATENT DOCUMENTS

JP 2005-63823 A 3/2005

* cited by examiner

*Primary Examiner*—Douglas W Owens
*Assistant Examiner*—Jianzi Chen
(74) *Attorney, Agent, or Firm*—Sughrue Mion, PLLC

(57) ABSTRACT

A discharge lamp lighting circuit is provided. The discharge lamp lighting circuit includes an inverter circuit which has two output ends; a series resonant circuit which includes a capacitor, an inductor and a transformer, coupled in series; a driving portion; and a controlling portion which provides a control signal for controlling said inverter circuit, said controlling portion including a first signal producing portion which produces a first signal indicative of a phase of a current flowing through said series resonant circuit; and a second signal producing portion which produces a second signal indicative of a phase of the AC voltage output from said inverter circuit, said controlling portion producing the control signal on the basis of a phase difference between the first and second signals, wherein one component of said series resonant circuit is coupled between one of said output ends, and a detection point.

14 Claims, 14 Drawing Sheets

FIG. 7 (a)
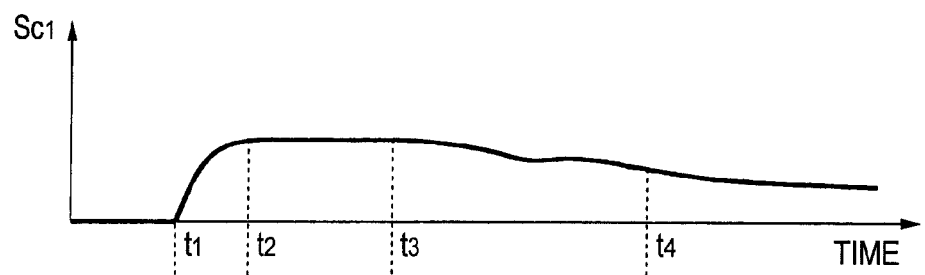
FIG. 7 (b)
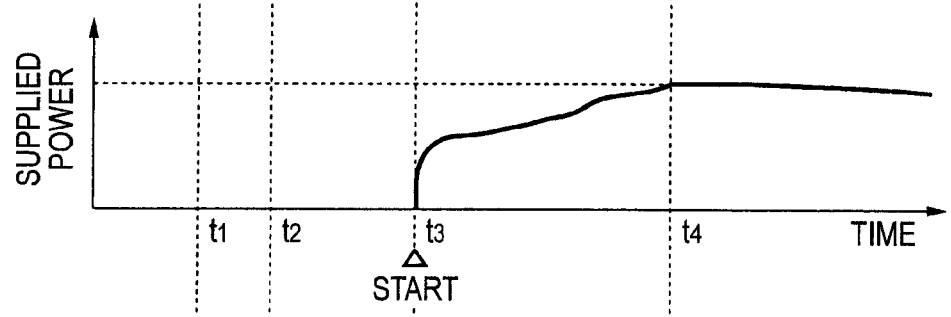
FIG. 7 (c)
| | OCV CONTROL | FREQUENCY FOLLOWING | POWER CONTROL |
|---|---|---|---|

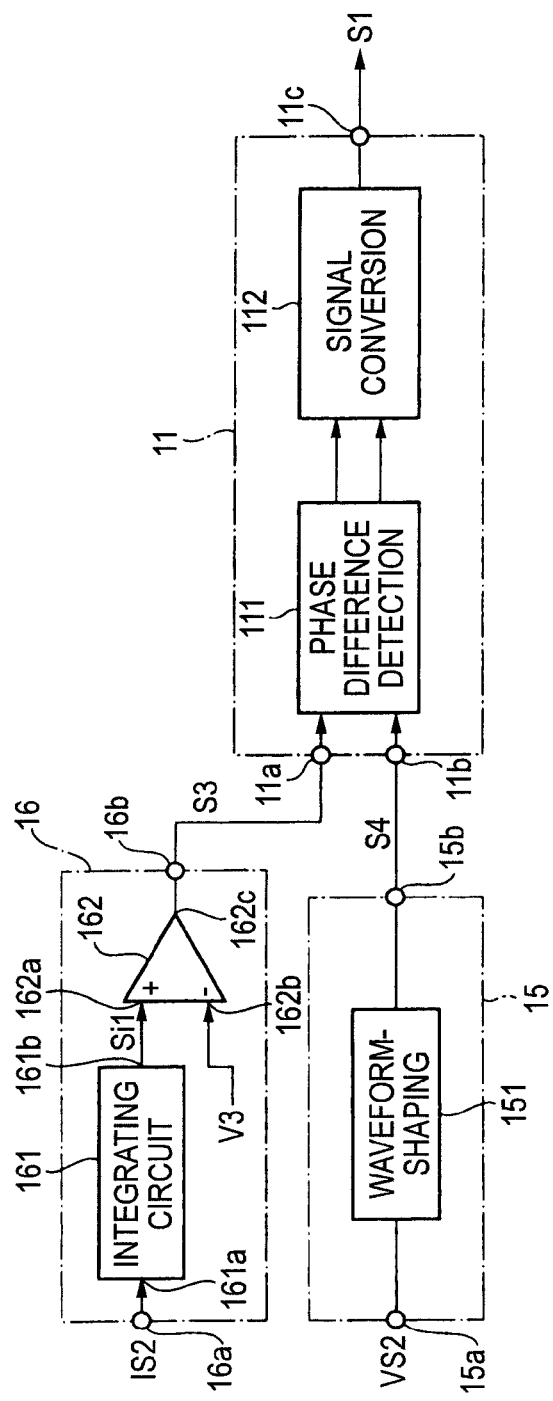
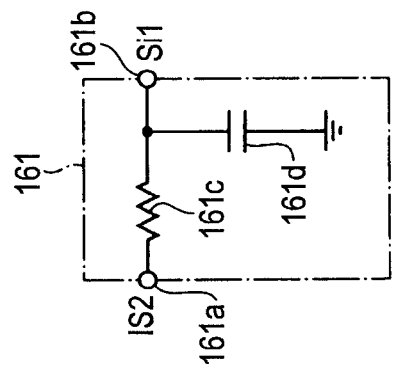
FIG. 11 (a)
FIG. 11 (b)

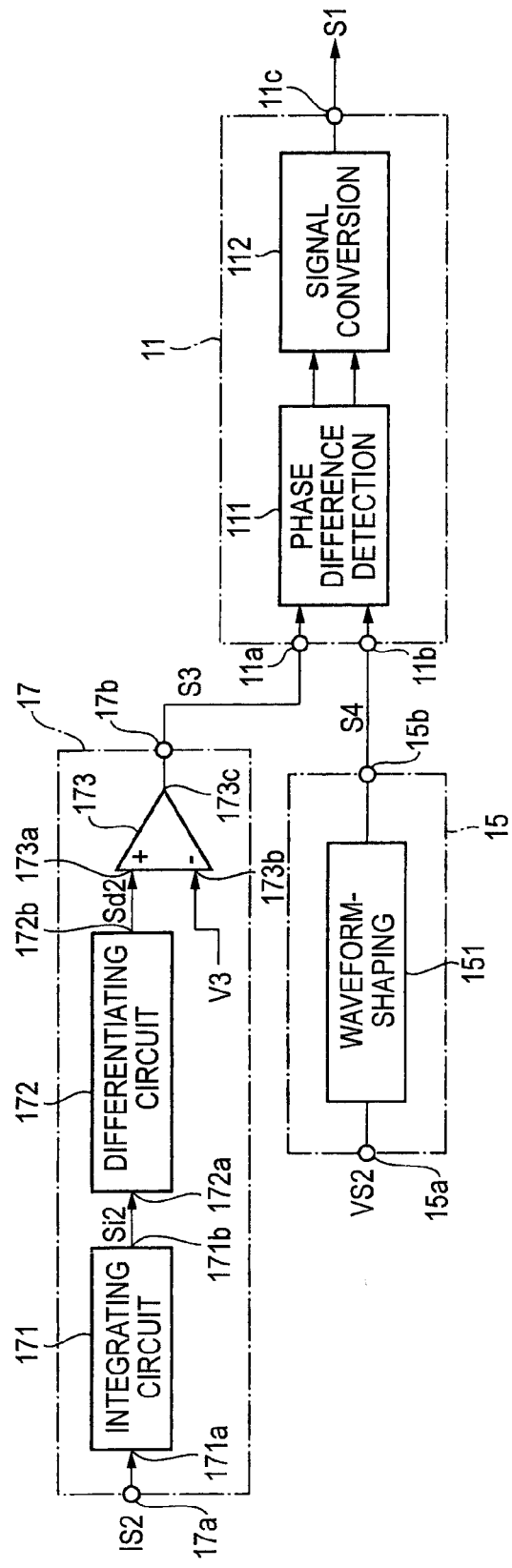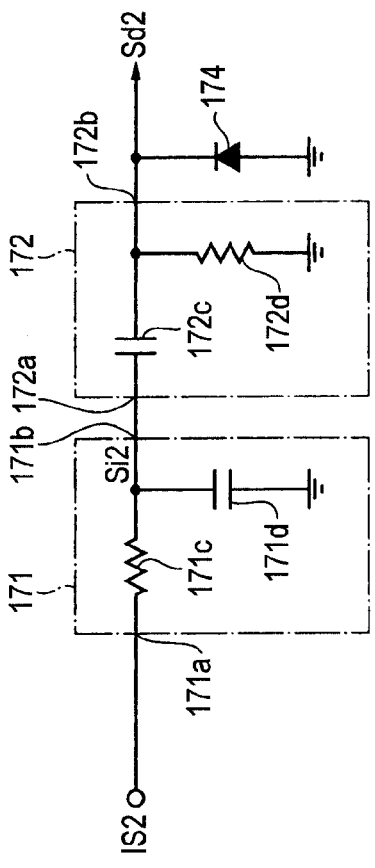
FIG. 12 (a)
FIG. 12 (b)

DISCHARGE LAMP LIGHTING CIRCUIT

This application claims priority from Japanese Patent Application No. 2006-352776, filed Dec. 27, 2006, in the Japanese Patent Office. Japanese Patent Application No. 2006-352776 is hereby incorporated by reference in its entirety.

TECHNICAL FIELD

Apparatuses consistent with the present invention relate to a discharge lamp lighting circuit.

RELATED ART

In order to light a discharge lamp such as a metal halide lamp used as a headlamp for a vehicle, a lighting circuit (i.e., a ballast) for stably supplying a power to the lamp is used. For example, Japanese Patent Unexamined Publication No. 2005-63823 shows a related art discharge lamp lighting circuit which comprises a DC-AC converting circuit including a series resonant circuit. The DC-AC converting circuit supplies an AC power to a discharge lamp. The level of the supplied power is controlled by changing a driving frequency of a bridge driver which drives the series resonant circuit.

When the driving frequency of the series resonant circuit is to be changed, one option is to control the driving frequency on the basis of a phase difference between a voltage and current of the series resonant circuit. In this case, when a maximum power of the series resonant circuit is to be supplied while making the driving frequency of the bridge driver coincident with the resonant frequency of the series resonant circuit, for example, the driving frequency may be controlled so that the phase difference between the voltage and current of the series resonant circuit approaches zero.

In such a case, it is advantageous to individually detect the phases of the voltage and current of the series resonant circuit. One related art option for detecting the phase of a current uses a transformer inserted into the series resonant circuit. The current is then detected from the secondary side of the transformer. However, in a case where the resonant frequency of the series resonant circuit becomes high, for example, 2 MHz, the iron loss of the current detection transformer becomes large. Furthermore, the number of components of the circuit is increased, so that a size and a production cost are increased.

Another option for detecting the phase of a current of a series resonant circuit is to use a resistor. A resistor for detecting a current is inserted into the series resonant circuit, and the phase of a current is detected from the waveform of a voltage across the resistor. In a discharge lamp lighting circuit, the level of a current flowing through a series resonant circuit varies greatly in a range of several hundreds of mA to 100 A. Thus, when the resistance of the resistor for detecting the current is increased in order to ensure a high detection accuracy in the case of a lower current, the power loss in the case of a higher current becomes excessively large. By contrast, when the resistance of the resistor for detecting a current is decreased in order to reduce the power loss in the case of a higher current, a high detection accuracy in the case of a lower current cannot be ensured.

In order to address some of these problems, yet another option has been suggested in the related art. In the secondary side of a transformer for transmitting an AC power of a series resonant circuit to a discharge lamp (i.e., the side to which the discharge lamp is coupled), a resistor for detecting a current is coupled in series to the discharge lamp, a current (i.e., a lamp current) flowing through the discharge lamp is detected from a voltage across the resistor, and a phase of this current is determined used as the current of the series resonant circuit. However, this option also has problems. First, detection is disabled during a period when the discharge lamp is not lighted. Second, since the lamp current is very small immediately after the lighting of the discharge lamp, detection is also disabled during a period when the discharge lamp is transferred from a glow discharge to an arc discharge, and hence the driving frequency cannot be controlled during this period. Lastly, as a practical matter, the phase of the current of the series resonant circuit is not coincident with that of the lamp current, and hence the difference of the two phases may adversely affect the control of the driving frequency.

BRIEF SUMMARY OF THE PRESENT INVENTION

Exemplary embodiments of the present invention provide a discharge lamp lighting circuit in which a transformer or resistor for detecting a current is not used in a series resonant circuit, and the phase of the current of the series resonant circuit can be accurately detected even in a state where a discharge lamp is not lighted, or an arc discharge has not yet occurred.

According to an aspect of the present invention, a discharge lamp lighting circuit is provided which supplies an AC power for lighting a discharge lamp, to the discharge lamp, wherein the discharge lamp lighting circuit comprises an inverter circuit which has two output ends, and which outputs an AC voltage between the two output ends; a series resonant circuit which includes a capacitor and at least one of an inductor and a transformer, and which supplies the AC power to the discharge lamp, the capacitor and the at least one of the inductor and the transformer being coupled in series between the two output ends of the inverter circuit; a driving portion which drives the inverter circuit; and a controlling portion which provides the driving portion with a control signal for controlling a driving frequency of the inverter circuit. The controlling portion comprises a first signal producing portion which produces a first signal indicative of a phase of a current flowing through the series resonant circuit; and a second signal producing portion which produces a second signal indicative of a phase of the AC voltage output from the inverter circuit, the controlling portion producing the control signal on the basis of a phase difference between the first and second signals. The first signal producing portion produces the first signal on the basis of a voltage at a detection point in the series resonant circuit, and one of the inductor, the transformer, and the capacitor is coupled between one of the two output ends, and the detection point.

In the discharge lamp lighting circuit, the controlling portion which controls the driving frequency of the inverter circuit may include the first signal producing portion for detecting the phase of the current flowing through the series resonant circuit; and the second signal producing portion for detecting the phase of the AC voltage output from the inverter circuit. The controlling portion may control the driving frequency on the basis of the phase difference between the current flowing through the series resonant circuit and the AC voltage. According to this exemplary configuration, for example, the driving frequency is controlled so that a phase difference between the voltage and current of the series resonant circuit approaches zero, and the driving frequency of the inverter circuit is made coincident with the resonant frequency of the series resonant circuit, so that the maximum power of the series resonant circuit can be supplied to the discharge lamp.

In the discharge lamp lighting circuit, one of the inductor, the transformer, and the capacitor is coupled between one of the two output ends of the inverter circuit, and the detection point of the first signal producing portion. When the voltage of the plus output end of the inverter circuit is indicated by Va, and that of the position between which and the output end one of the inductor, the transformer, and the capacitor is coupled is indicated by Vb, the relationship between the voltages Va and Vb is expressed by following Expression (1). In Expression (1), Z denotes an impedance of the inductor, the transformer, or the capacitor, and I denotes a current flowing through the series resonant circuit.

[Exp. 1]

$$Vb = Va - Z \cdot I \qquad (1)$$

When the voltage of the minus output end of the inverter circuit is indicated by Vc, and that of the position between which and the output end one of the inductor, the transformer, and the capacitor is coupled is indicated by Vd, the relationship between the voltages Vc and Vd is expressed by following Expression (2).

[Exp. 2]

$$Vd = Vc + Z \cdot I \qquad (2)$$

In Expression (1), the potential Va denotes a plus output of the inverter circuit, and either of the power source voltage and the ground potential. In Expression (2), the potential Vc denotes a minus output of the inverter circuit, and the ground potential. Therefore, the value of the current I is obtained from the value of the voltage Vb according to Expression (1), or from the value of the voltage Vd according to Expression (2). In other words, the phase of the current can be known by detecting the voltage Vb (or Vd) at the detection point in the series resonant circuit.

In the discharge lamp lighting circuit, namely, the phase of the current may be obtained by referring to the potential at the detection point in the series resonant circuit. Therefore, a transformer or resistor for detecting a current is not used in the series resonant circuit, and the phase of the current of the series resonant circuit can be accurately detected even in a state where the discharge lamp is not lighted, or an arc discharge has not yet occurred.

Furthermore, the discharge lamp lighting circuit may be characterized in that the capacitor is coupled between the detection point and the one output end. Usually, an inverter circuit is configured by a transistor, and an element which is of the surface mount type and which has a small size is often used as the transistor. Similarly, a capacitor which is of the surface mount type, and which is relatively smaller than an inductor and a transformer can be used. When a capacitor is disposed in place of an inductor or a transformer between the detection point of the first signal producing portion and the one output end of the inverter circuit, the current path of the series resonant circuit can be shortened, and the high-frequency characteristic of the series resonant circuit can be stabilized. Furthermore, a transistor and capacitor which are small in size can be disposed close to each other, so that the space on a circuit board can be efficiently used.

Furthermore, the discharge lamp lighting circuit may be characterized in that the first signal producing portion comprises a differentiating circuit which differentiates the voltage at the detection point; and a converting circuit which converts an output signal of the differentiating circuit to a digital signal. Alternatively, the discharge lamp lighting circuit may be characterized in that the first signal producing portion comprises an integrating circuit which integrates the voltage at the detection point; and a converting circuit which converts an output signal of the integrating circuit to a digital signal.

According to an aspect of the present invention, in the discharge lamp lighting circuit, one of the inductor, the transformer, and the capacitor is coupled between the output end of the inverter circuit, and the detection point of the first signal producing portion. In a state where an arc discharge has not yet occurred, for example, the impedance of the discharge lamp is high, and hence the current I of the series resonant circuit is large. In such a state, the phase of the voltage Vb (Vd) at the detection point leads (or lags) by about 90° the current I. Also in the case where the driving frequency is controlled so that the phase difference between the voltage and current of the series resonant circuit approaches zero, and the driving frequency of the inverter circuit is made coincident with the resonant frequency of the series resonant circuit, the phase of the voltage Vb (Vd) leads (or lags) by about 90° the current I. In these cases, when the voltage at the detection point is differentiated (or integrated), the phase difference between the differentiated (or integrated) voltage and the current I is about 0° or about 180°. Therefore, the phase difference between the voltage Va after being converted to a digital signal and the current I can be easily processed.

Furthermore, the discharge lamp lighting circuit may be characterized in that the first signal producing portion comprises a first circuit which performs one of integration and differentiation on the voltage at the detection point; a second circuit which performs another one of integration and differentiation on an output signal of the first circuit; and a converting circuit which converts an output signal of the second circuit to a digital signal.

In the case where the voltage at the detection point is differentiated by the differentiating circuit, the differentiating circuit cuts the DC component of an input signal, and hence detection of a zero crossing of the voltage at the detection point is highly accurate. When the voltage at the detection point contains high-frequency noise, however, the differentiating circuit tends to allow the noise components to pass therethrough because the gain is higher as the frequency is higher, and hence erroneous detection may be caused. By contrast, in the case where the voltage at the detection point is integrated by the integrating circuit, when the input signal contains high-frequency noise, the integrating circuit cuts the noise components, and the signal to noise (S/N) ratio can be improved. In order to realize a phase lag, however, the gain is excessively lowered, and there is a possibility that a signal cannot be detected. When the integrating and differentiating circuits are combined with each other and the circuits are set to respective adequate cutoff frequencies, the S/N ratio can be improved while the accuracy of detection of a zero crossing of the voltage at the detection point is enhanced.

Other aspects will be apparent from the following detailed description, the accompanying drawings and the claims.

BRIEF DESCRIPTION OF THE DRAWINGS

FIGS. 7(a) to 7(c) are graphs showing transitions of a control signal and a supplied power, respectively, of the discharge lamp lighting circuit of FIG. 1;

FIG. 11(a) is a block diagram of internal configurations of the frequency following controlling portion, and the first and second signal producing portions according to another exemplary embodiment of the present invention, and FIG. 11(b) is a view showing an example of the circuit configuration of an integrating circuit according to an exemplary embodiment of the present invention;

FIG. 12(a) is a block diagram of internal configurations of the frequency following controlling portion, and the first and second signal producing portions according to another exemplary embodiment of the present invention, and FIG. 12(b) is a view showing an example of the circuit configuration of an integrating circuit and a differentiating circuit according to another exemplary embodiment of the present invention;

DETAILED DESCRIPTION OF EXEMPLARY EMBODIMENT OF THE PRESENT INVENTION

Figure 1:
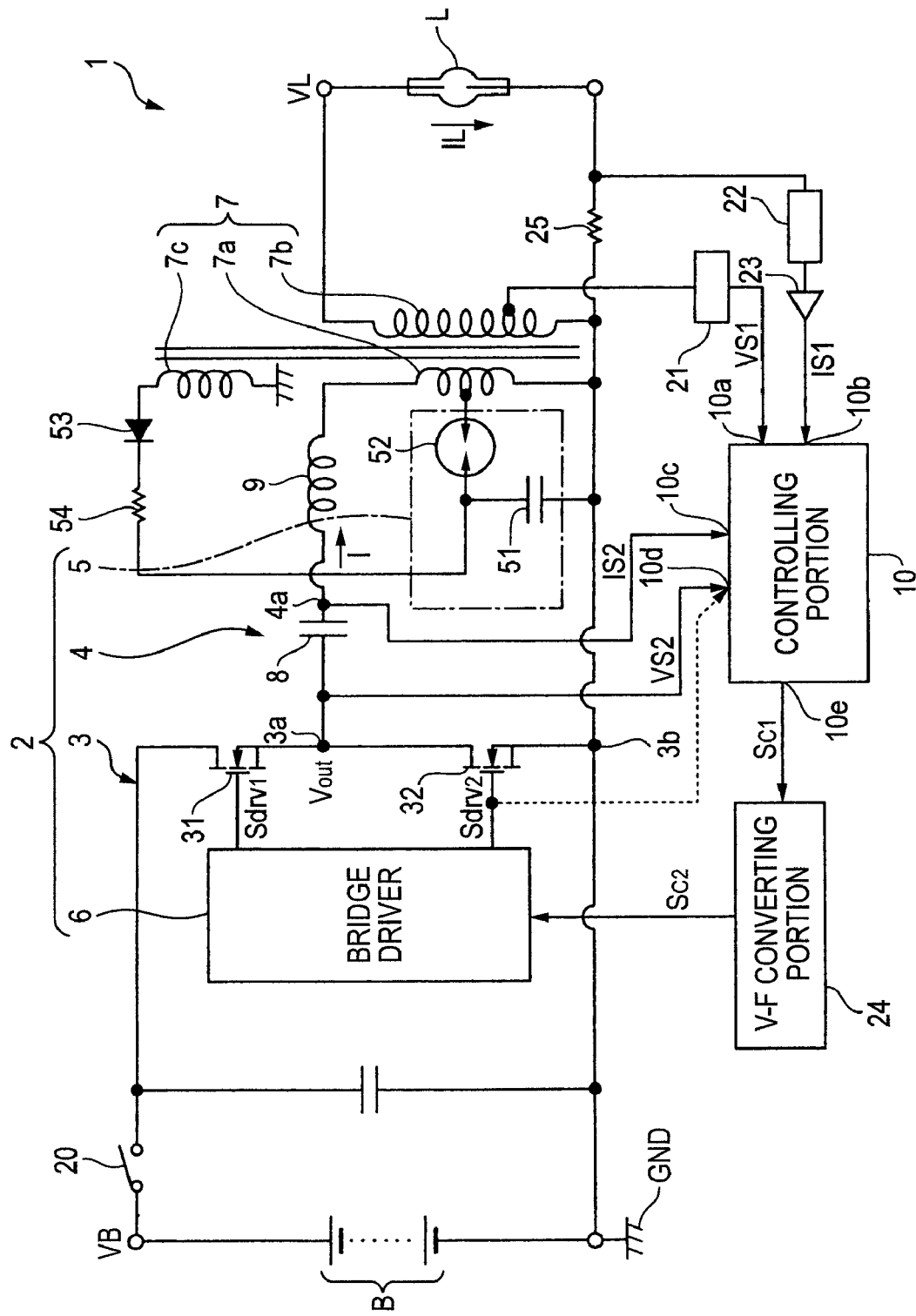
FIG. 1 is a block diagram showing a discharge lamp lighting circuit according to an exemplary embodiment of the present invention.

Hereinafter, exemplary embodiments of the discharge lamp lighting circuit of the invention will be described in detail with reference to the accompanying drawings. In the description of the drawings, identical parts are denoted by the same reference numerals, and their duplicated description will be omitted.

FIG. 1 is a block diagram showing a configuration of a discharge lamp lighting circuit according to an exemplary embodiment of the present invention. The discharge lamp lighting circuit 1 shown in FIG. 1 supplies an AC power for lighting a discharge lamp L, to the discharge lamp L, or converts a DC voltage VB from a DC power source B to an AC voltage, and supplies the AC voltage to the discharge lamp L. The discharge lamp lighting circuit 1 is used mainly in a lighting device for a vehicle, such as a headlamp. However, the discharge lamp lighting circuit 1 may also be used with other lighting devices in other applications using similar lighting devices. As the discharge lamp L, for example, a mercury-free metal halide lamp may be used. However, discharge lamps having another structures may also be used with the discharge lamp lighting circuit according to exemplary embodiments of the invention.

The discharge lamp lighting circuit 1 comprises a power supplying portion 2, a controlling portion 10, and a voltage to frequency (V-F) converting portion 24. The power supplying portion 2 receives a power supply from the DC power source B, and supplies the AC power to the discharge lamp L. The controlling portion 10 controls the level of the power to be supplied to the discharge lamp L. The V-F converting portion 24 performs voltage-frequency conversion (V-F conversion) on a control signal $Sc_1$ which is an analog signal supplied from the controlling portion 10, to produce a control signal $Sc_2$.

The power supplying portion 2 supplies a power the level of which is based on the control signal $Sc_2$ supplied from the controlling portion 10, to the discharge lamp L. The power supplying portion 2 is coupled to the DC power source B (such as a battery) via a switch 20 for a lighting operation, to receive the DC voltage VB from the DC power source B, and performs AC converting and voltage boosting operations. In this exemplary embodiment, the power supplying portion 2 comprises a half-bridge inverter circuit (hereinafter, referred to simply as an inverter circuit) 3 which converts the DC voltage VB to an AC voltage of a rectangular wave; a series resonant circuit 4 which is disposed in a subsequent stage of the inverter circuit 3; a starting portion 5 which, at the start of lighting, applies a high-voltage pulse to the discharge lamp L to promote lighting; and a bridge driver 6 which is a driving portion for driving the inverter circuit 3.

The inverter circuit 3 has two output ends 3a, 3b, and outputs the AC voltage of a rectangular wave between the output ends 3a, 3b. The inverter circuit 3 is configured by coupling in series two transistors 31, 32 which are switching elements. Specifically, one current terminal (drain terminal) of the transistor 31 is coupled to a plus terminal of the DC power source B through the switch 20, and the other current terminal (source terminal) of the transistor 31 is coupled to one current terminal (drain terminal) of the transistor 32. The control terminal (gate terminal) of the transistor 31 is coupled to the bridge driver 6. The other current terminal (source terminal) of the transistor 32 is coupled to a ground potential line GND (i.e., a minus terminal of the DC power source B), and the control terminal (gate terminal) of the transistor 32 is coupled to the bridge driver 6. The output end 3a of the inverter circuit 3 is taken from the source terminal of the transistor 31 (also the drain terminal of the transistor 32), and the output end 3b is taken from the source terminal of the transistor 32. The bridge driver 6 supplies drive signals $Sdrv_1$, $Sdrv_2$ which are opposite in phase to each other, to the gate terminals of the transistors 31, 32, respectively, thereby causing the transistors 31, 32 to be alternatingly conductive. As the transistors 31, 32, N-channel metal oxide field effect transistors (MOSFETs) are used, as shown for example in FIG. 1. However, other FETs or bipolar transistors may also be used.

The series resonant circuit 4 comprises a transformer 7, a capacitor 8, and an inductor 9. The transformer 7 is disposed so as to apply a high-voltage pulse to the discharge lamp L, transmit the power, and boost the power. The transformer 7, the capacitor 8, and the inductor 9 constitute a series resonant circuit. Namely, the capacitor 8, the inductor 9, and a primary winding 7a of the transformer 7 are coupled in series. An end of the series circuit on the side of the capacitor 8 is coupled to the one output end 3a of the inverter circuit 3, and an other end on the side of the primary winding 7a is coupled to the other output end 3b of the inverter circuit 3. According to this exemplary configuration, the resonant frequency is determined by a combined reactance configured by the leakage inductance of the primary winding 7a of the transformer 7, and the inductance of the inductor 9, and the capacitance of the capacitor 8. Alternatively, the series resonant circuit may be configured only by the primary winding 7a and the capacitor 8, and the inductor 9 may be omitted. Alternatively, the inductance of the primary winding 7a may be set to be much smaller than that of the inductor 9, and the resonant frequency may be determined substantially by the inductor 9 and the capacitance of the capacitor 8.

In the inverter circuit 3 and the series resonant circuit 4, using the series resonance phenomenon due to the capacitor 8 and the inductive elements (the inductance component and the inductor), the transistors 31, 32 are alternatingly turned on and off while the driving frequency of the transistors 31, 32 is set to a value which is equal to or higher than the series resonant frequency, thereby causing an AC power to be produced in the primary winding 7a of the transformer 7. The AC power is transmitted to a secondary winding 7b of the transformer 7 while being boosted, and then supplied to the discharge lamp L coupled to the secondary winding 7b. The bridge driver 6 which drives the transistors 31, 32 complementarily drives the transistors 31, 32 so that both the transistors 31, 32 are not simultaneously in the conductive state.

In the series resonant circuit 4, the series resonant frequency fa before lighting, and the series resonant frequency fb after lighting are expressed by the following Expressions (3) and (4), respectively. In the Expressions, C denotes the capacitance of the capacitor 8, Lr denotes the inductance of the inductor 9, Lp1 denotes the inductance of the primary winding 7a before lighting, and Lp2 denotes the inductance of the primary winding 7a after lighting.

$$fa = \frac{1}{2\pi\sqrt{C \times (Lr + Lp1)}}$$ [Exp. 3]

$$fb = \frac{1}{2\pi\sqrt{C \times (Lr + Lp2)}}$$ [Exp. 4]

It is advantageous to select Lp1>Lp2. Therefore, the series resonant frequency fa before lighting is lower than the series resonant frequency fb after lighting.

The impedance of the series resonant circuit 4 is changed in accordance with the driving frequency of the transistors 31, 32 by the bridge driver 6. Therefore, the level of the AC power to be supplied to the discharge lamp L can be controlled by changing the driving frequency. Namely, the level of the power supplied to the discharge lamp L has a maximum value when the driving frequency is equal to the series resonant frequency, and is further decreased as the driving frequency moves away (either above or below the series resonant frequency. When the driving frequency is lower than the series resonant frequency, however, a switching loss is large and the power efficiency is reduced. Therefore, the magnitude of the driving frequency of the bridge driver 6 is advantageously controlled within a region where the driving frequency is higher than the series resonant frequency. The region where the frequency is lower than the series resonant frequency is referred to as a capacitive region, and that where the frequency is higher than the series resonant frequency is referred to as an inductive region. In this exemplary embodiment, the driving frequency of the bridge driver 6 is controlled in accordance with a pulse frequency of the control signal $Sc_2$ (a signal including a frequency-modulated pulse train) supplied from the V-F converting portion 24 coupled to the bridge driver 6.

The starting portion 5 is a circuit for applying the high-voltage pulse for starting to the discharge lamp L. When the starting portion 5 applies a trigger voltage and current to the transformer 7, the high-voltage pulse is superimposed on the AC voltage produced in the secondary winding 7b of the transformer 7. The starting portion 5 comprises a starting capacitor (capacitive element) 51 which stores a power for producing the high-voltage pulse; and a self-breakdown switching element 52 such as a spark gap or a gas arrester. One end of the starting capacitor 51 is coupled to one end of an auxiliary winding 7c of the transformer 7 via a rectifying element (i.e., a diode) 53 and a resistor element 54, to provide the starting portion 5 with the input voltage. Both the other ends of the auxiliary winding 7c and the starting capacitor 51 are coupled to the output end 3b of the inverter circuit 3 (i.e., the ground potential line GND). Alternatively, the input voltage of the starting portion 5 may be obtained, for example, from the secondary winding 7b of the transformer 7, or from an auxiliary winding which cooperates with the inductor 9 to configure a transformer.

One end of the self-breakdown switching element 52 is coupled to one end of the starting capacitor 51, and the other end of the self-breakdown switching element 52 is coupled to the middle of the primary winding 7a. In the starting portion 5, when the across voltage of the starting capacitor 51 reaches the discharge starting voltage of the self-breakdown switching element 52, the self-breakdown switching element 52 is momentarily set to the conductive state, thereby outputting the trigger voltage and current.

The controlling portion 10 controls the driving frequency of the bridge driver 6 (i.e., the level of the power to be supplied to the discharge lamp L). The controlling portion 10 comprises input ends 10a to 10d, and an output end 10e. In order to receive a signal (hereinafter, referred to as a lamp voltage corresponding signal) VS1 indicative of the amplitude of a lamp voltage VL of the discharge lamp L, the input end 10a is coupled to an intermediate tap of the secondary winding 7b via a peak-hold circuit 21. The lamp voltage corresponding signal VS1 is set to be, for example, 0.35 times the peak value of the lamp voltage VL. The input end 10b is coupled to one end of a resistor element 25 which is disposed for detecting the lamp current IL of the discharge lamp L, via a peak-hold circuit 22 and a buffer 23. The one end of the resistor element 25 is further coupled to one electrode of the discharge lamp L via an output terminal of the discharge lamp lighting circuit 1, and the other end of the resistor element 25 is coupled to the output end 3b (ground potential line GND) of the inverter circuit 3. The buffer 23 outputs a signal (hereinafter, referred to as a lamp current corresponding signal) IS1 indicative of the amplitude of the lamp current IL.

The input end 10c is coupled to a detection point 4a in the series resonant circuit 4. The potential at the detection point 4a is supplied to the input end 10c as a signal IS2 for detecting the phase of the current of the series resonant circuit 4. In this exemplary embodiment, the detection point 4a is set between the capacitor 8 and the inductor 9. Among the elements comprising the series resonant circuit 4 (i.e., the capacitor 8, the inductor 9, and the primary winding 7a of the transformer 7), only the capacitor 8 is coupled between the output end 3a of the inverter circuit 3 and the detection point 4a in this exemplary embodiment.

The input end 10d is coupled to the output end 3a of the inverter circuit 3. In order to detect the phase of the AC voltage output from the inverter circuit 3, an output voltage Vout of the inverter circuit 3 is supplied to the input end 10d as a signal VS2. As indicated by the broken line in the figure, the input end 10d may be coupled, for example, to the connection between the bridge driver 6 and the gate terminal of the transistor 32 (or the transistor 31). In this case, the drive signal $Sdrv_2$ (or the drive signal $Sdrv_1$) is supplied to the input end 10d. The input end 10d may be coupled to any place as far as the phase of the AC voltage output from the inverter circuit 3 can be detected in the place.

The V-F converting portion 24 receives the control signal $Sc_1$ which is an analog signal, through the output end 10e of the controlling portion 10, and applies the V-F conversion on the control signal $Sc_1$ to produce the control signal $Sc_2$. In this exemplary embodiment, the V-F converting portion 24 is configured so that the pulse frequency of the control signal $Sc_2$ is higher as the input voltage (i.e., the voltage of the control signal $Sc_1$) is lower.

Figure 2:
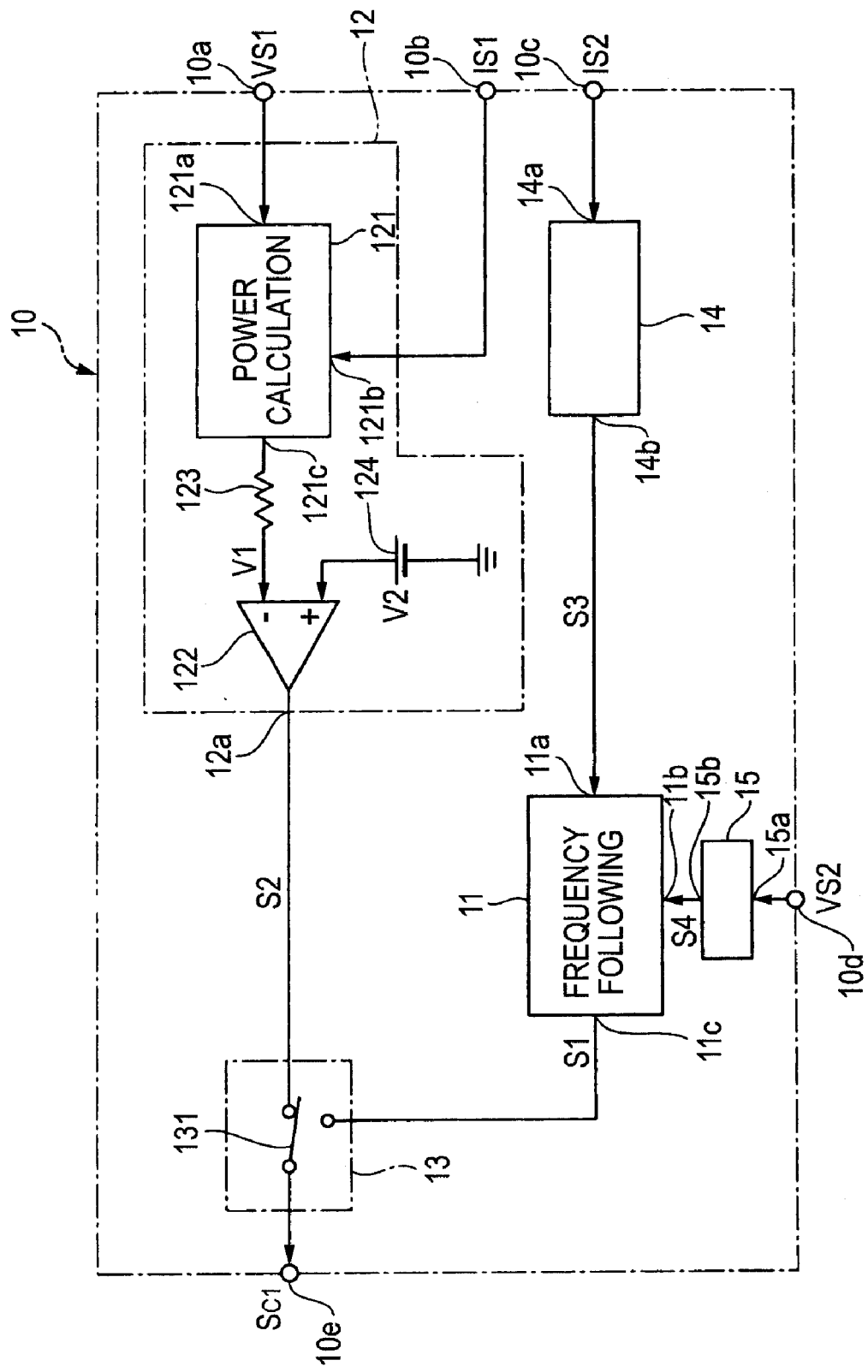
FIG. 2 is a block diagram showing an example of an internal configuration of a controlling portion of the discharge lamp lighting circuit of FIG. 1.

Next, an internal configuration of the controlling portion 10 in the embodiment will be described. FIG. 2 is a block diagram showing an example of the internal configuration of the controlling portion 10 according to an exemplary embodiment of the present invention. As shown in FIG. 2, the controlling portion 10 comprises a frequency following controlling portion 11 which produces a control signal S1; a power controlling portion 12 which produces a control signal S2; a selecting portion 13 which selectively supplies one of the control signals S1, S2 to the output end 10e; a first signal producing portion 14 which waveform-shapes the signal IS2 and then supplies it to the frequency following controlling portion 11; and a second signal producing portion 15 which waveform-shapes the signal VS2 and then supplies it to the frequency following controlling portion 11.

The frequency following controlling portion 11 produces the control signal S1 which causes the phase difference between the voltage and current of the series resonant circuit 4 to approach zero. The frequency following controlling portion 11 comprises input ends 11a, 11b and an output end 11c. The signal IS2 is supplied to the input end 11a via the input end 10c of the controlling portion 10. The signal VS2 is supplied to the input end 11b via the input end 10d of the controlling portion 10. The frequency following controlling portion 11 produces the control signal S1 so that the difference between the phase of the current of the series resonant circuit detected on the basis of the signal IS2, and that of the output voltage Vout of the inverter circuit 3 detected on the basis of the signal VS2 approaches zero, and supplies the control signal S1 to the selecting portion 13.

Before lighting of the discharge lamp L, the power controlling portion 12 produces a control signal S2 so that the level of the open circuit voltage (OCV) to be supplied to the discharge lamp L becomes close to a threshold value. The threshold value may be predetermined. After lighting of discharge lamp L, the power controlling portion 12 produces the control signal S2 so that the level of the power to be supplied to the discharge lamp L becomes close to a steady-state value in accordance with a time function. The time function may be predetermined.

For example, the power controlling portion 12 produces the control signal S2 so that, after the lighting of the discharge lamp L, the level of the supplied power first becomes an initial value (for example, 75 W) in accordance with the time function, and, after a certain time, the level of the supplied power gradually approaches from an initial value to the steady-state value (for example, 35 W).

In this exemplary embodiment, as shown in FIG. 2, the power controlling portion 12 has a power calculating portion 121 and an error amplifier 122. The power calculating portion 121 comprises an input end 121a which receives the lamp voltage corresponding signal VS1 via the input end 10a of the controlling portion 10; and an input end 121b which receives the lamp current corresponding signal IS1 via the input end 10b of the controlling portion 10. Before lighting of the discharge lamp L, the power calculating portion 121 produces an output voltage V1 so that the lamp voltage corresponding signal VS1 indicative of the level of the OCV becomes close to the threshold value, and, after the lighting of the discharge lamp L, produces the output voltage V1 so that the level of the supplied power becomes close to the steady-state value in accordance with the time function, on the basis of the lamp voltage corresponding signal VS1 and the lamp current corresponding signal IS1. The output voltage V1 is supplied from an output end 121c of the power calculating portion 121 to the inverting input terminal of the error amplifier 122, via a resistor 123. The non-inverting input terminal of the error amplifier 122 is coupled to a voltage source 124 which produces a reference voltage V2. The reference voltage may be predetermined. The output voltage from the error amplifier 122 is provided to the selecting portion 13 as the control signal S2.

The selecting portion 13 is configured, for example, by a switch 131. Before the high-voltage pulse is applied to the discharge lamp L by the starting portion 5, the switch 131 couples an output end 12a of the power controlling portion 12 to the output end 10e of the controlling portion 10. During a time period of several milliseconds after application of the high-voltage pulse to the discharge lamp L, the switch 131 couples the output end 11c of the frequency following controlling portion 11 to the output end 10e of the controlling portion 10. After elapse of several milliseconds from application of the high-voltage pulse, the switch 131 again couples the output end 12a of the power controlling portion 12 to the output end 10e of the controlling portion 10. Before application of the high-voltage pulse to the discharge lamp L, therefore, the control signal S2 is output from the controlling portion 10, and, during several milliseconds immediately after application of the high-voltage pulse to the discharge lamp L, therefore, the control signal S1 is output, and thereafter the control signal S2 is again output. The controlling portion 10 supplies the thus selected control signal S1 or S2 to the V-F converting portion 24 (see FIG. 1) as the control signal $Sc_1$.

The first signal producing portion 14 waveform-shapes the signal IS2 to digitize the signal, thereby producing a signal S3. The signal S3 indicates the phase of the current flowing through the series resonant circuit 4. The first signal producing portion 14 comprises an input end 14a and an output end 14b. The signal IS2 is supplied to the input end 14a via the input end 10c of the controlling portion 10. On the basis of the signal IS2 (i.e., the voltage waveform at the detection point 4a in FIG. 1), the first signal producing portion 14 produces the signal S3, and supplies the signal S3 to the frequency following controlling portion 11 through the output end 14b.

The second signal producing portion 15 waveform-shapes the signal VS2 to digitize the signal, thereby producing a signal S4. The signal S4 indicates the phase of the voltage (AC voltage) Vout output from the inverter circuit 3. The second signal producing portion 15 comprises an input end 15a and an output end 15b. The signal VS2 is supplied to the input end 15a via the input end 10d of the controlling portion 10. On the basis of the signal VS2 (i.e., the AC voltage Vout), the second signal producing portion 15 produces the signal S4, and supplies the signal S4 to the frequency following controlling portion 11 through the output end 15b.

Figure 3:
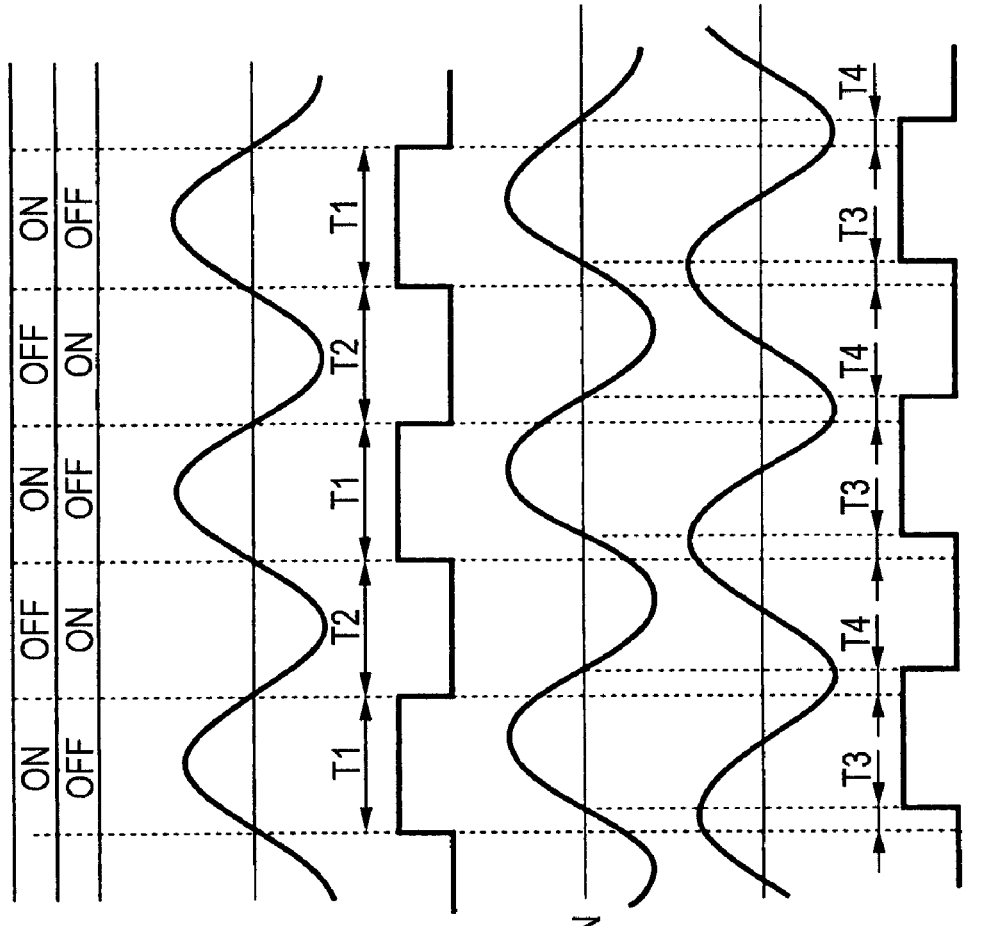
FIGS. 3(a) to 3(f) are graphs exemplarily showing temporal variations of waveforms in a case where a series resonant circuit operates in an inductive region, and indicating phase relationships of the waveforms.

The functions of the frequency following controlling portion 11, the first signal producing portion 14, and the second signal producing portion 15 will be described in further detail below. FIGS. 3(a) to 3(f) are graphs exemplarily showing temporal variations of waveforms in a case where the series resonant circuit 4 operates in the inductive region, and indicating phase relationships of the waveforms. FIG. 3(a) shows the on and off states of the transistors 31, 32; FIG. 3(b) shows the waveform of the signal VS2 (AC voltage Vout); FIG. 3(c) shows the waveform of the signal S4; FIG. 3(d) shows the current waveform of the series resonant circuit 4; FIG. 3(e) shows the waveform of the signal IS2 (i.e., the voltage waveform at the detection point 4a); and FIG. 3(f) shows the waveform of the signal S3. As shown in FIGS. 3(b) and 3(d), in the inductive region, the current of the series resonant circuit lags in phase the voltage.

Figure 4:
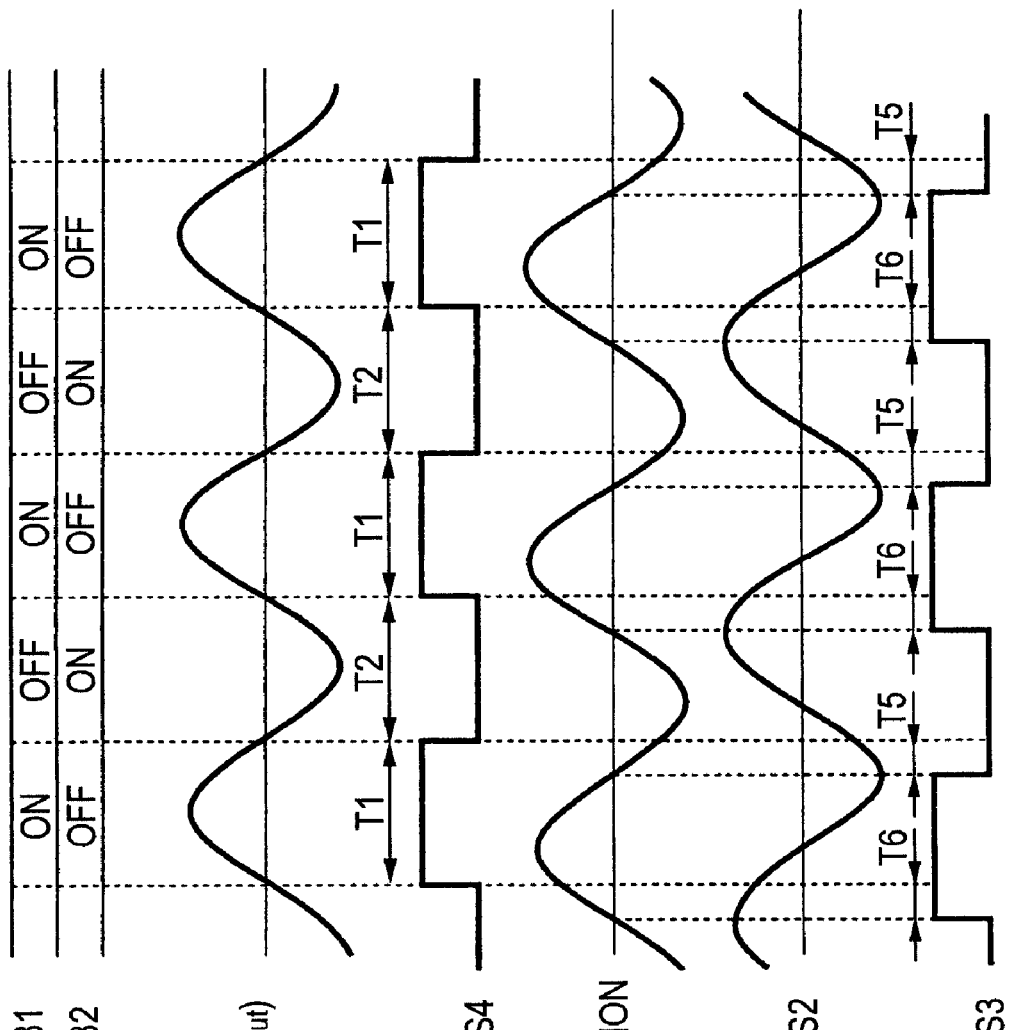
FIGS. 4(a) to 4(f) are graphs exemplarily showing temporal variations of waveforms in a case where a series resonant circuit operates in a capacitive region, and indicating phase relationships of the waveforms.

FIG. 4 is a graph exemplarily showing temporal variations of waveforms in a case where the series resonant circuit 4 operates in the capacitive region, and indicating phase relationships of the waveforms. FIG. 4(a) shows the on and off states of the transistors 31, 32; FIG. 4(b) shows the waveform of the signal VS2; FIG. 4(c) shows the waveform of the signal S4; FIG. 4(d) shows the current waveform of the series resonant circuit 4; FIG. 4(e) shows the waveform of the signal IS2; and FIG. 4(f) shows the waveform of the signal S3. As shown in FIG. 4(b) and FIG. 4(d), in the capacitive region, the current of the series resonant circuit leads in phase the voltage.

Since the capacitor 8 is coupled between the output end 3a of the inverter circuit 3 and the detection point 4a, the phase of the voltage at the detection point 4a (i.e., the signal IS2) shown in FIGS. 3(e) and 4(e), respectively, leads by about 90° the phase of the current of the series resonant circuit 4 shown in FIGS. 3(d) and 4(d), respectively. This is because when the voltage at the detection point 4a is indicated by $V_{IS2}$, the relationship between the voltages Vout and $V_{IS2}$ is expressed by following Expression (5). In Expression (5), Zc denotes the impedance of the capacitor 8, C denotes the capacitance of the capacitor 8, and I denotes the current flowing through the series resonant circuit 4.

$$V_{IS2} = Vout - Zc \cdot I = Vout + j\frac{1}{\omega C} \cdot I \quad \text{[Exp. 5]}$$

In Expression (5), the voltage Vout denotes the output of the inverter circuit 3, or either of the power source voltage VB or the ground potential. When the voltage Vout is the ground potential, the voltage $V_{IS2}$ is $$V_{IS2} = j\frac{1}{\omega C} \cdot I \quad \text{[Exp. 6]}$$

and the phase of the voltage $V_{IS2}$ leads by 90° the current I. When the voltage Vout is the power source voltage VB, the voltage $V_{IS2}$ is $$V_{IS2} = VB + j\frac{1}{\omega C} \cdot I \quad \text{[Exp. 7]}$$

and the phase of the voltage $V_{IS2}$ leads the current I by an angle expressed by following Expression (8)

$$\theta = \tan^{-1}\left(\frac{I}{VB \cdot \omega C}\right) \quad \text{[Exp. 8]}$$

When the duty ratio of the drive signals $Sdrv_1$, $Sdrv_2$ which are supplied from the bridge driver 6 to the inverter circuit 3 is 50%, therefore, the phase of the voltage $V_{IS2}$ leads the current I over one period by $$\Theta = \frac{90° + \theta}{2} \quad \text{[Exp. 9]}$$

In the case of the discharge lamp lighting circuit shown in FIG. 1, during a period when the transfer to an arc discharge is promoted immediately after lighting of the discharge lamp L, the discharge lamp L has a high resistance, and hence the impedance of the primary winding 7a of the transformer 7 is high, and the current I is increased. Therefore, θ in Expression (8) is approximately 90°, and Θ in Expression (9) is about 90°. As described later, the frequency following controlling portion 11 in this embodiment controls the bridge driver 6 so that the series resonant circuit 4 operates in the vicinity of the resonant frequency, and hence 1/ωC in Expressions (7) and (8) is a value which is sufficiently larger than VB. Consequently, θ in Expression (8) is approximately 90°, and Θ in Expression (9) is about 90°. For the above-described reason, the phase of the voltage $V_{IS2}$ at the detection point 4a shown in FIGS. 3(e) and 4(e) leads by about 90° the phase of the current I of the series resonant circuit 4 shown in FIGS. 3(d) and 4(d).

Figure 5:
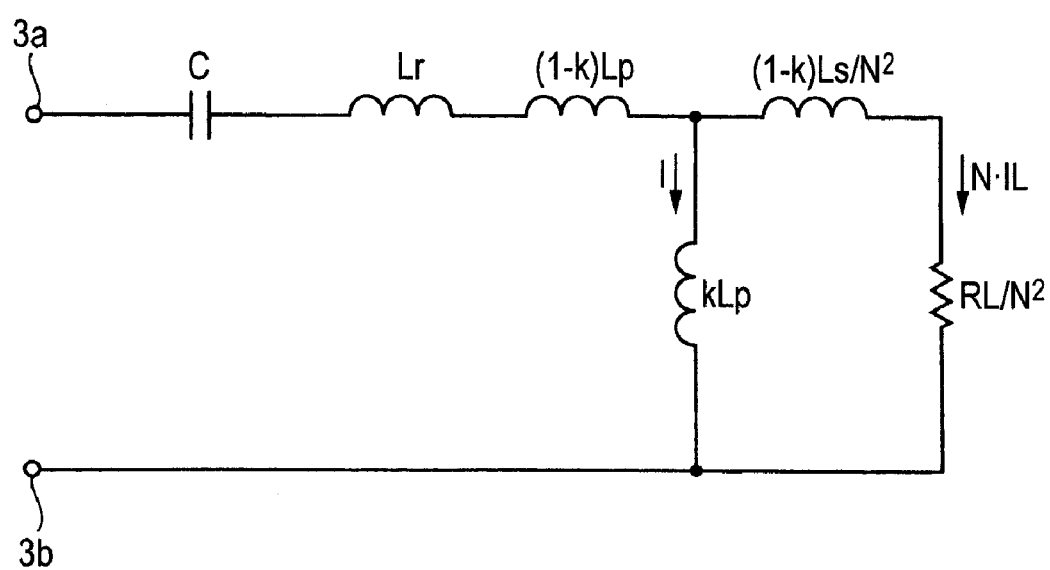
FIG. 5 is a circuit diagram showing an equivalent circuit of resonance portion of a series resonant circuit.

The reason that the current I is increased when the resistance of the discharge lamp L is high (the impedance of the primary winding 7a is high) will be described as follows. FIG. 5 shows a circuit diagram showing an equivalent circuit of the resonance portion of the series resonant circuit 4. In FIG. 5, C denotes the capacitance of the capacitor 8, Lr denotes the inductance of the inductor 9, Lp denotes the inductance of the primary winding 7a of the transformer 7, Ls denotes the inductance of the secondary winding 7b, RL denotes the resistance of the discharge lamp L, N denotes the turn ratio of the primary and secondary windings 7a, 7b of the transformer 7, k denotes a coupling constant of the transformer 7, IL denotes the lamp current, and I denotes the exciting current flowing through the primary winding 7a. In the equivalent circuit, the sum of I and IL is the resonant current. The relationship is expressed by the following Expression (10):

$$I = \frac{RL + j\omega(1-k)Ls}{N^2 \cdot \omega \cdot k \cdot Lp} \cdot N \cdot IL \quad \text{[Exp. 10]}$$

Expression (10) above indicates that, when the resistance RL of the discharge lamp L is high, the current I is increased.

As described above, the phase of the signal IS2 leads by about 90° the phase of the current I of the series resonant circuit 4. Therefore, the first signal producing portion 14 further advances the phase of the signal IS2 by 90°, then digitizes the signal to produce a signal in which the phase difference with respect to the current I of the series resonant circuit 4 is 180°, and inverts the resulting signal, thereby producing the signal S3 (see FIGS. 3(f) and 4(f)) in which the phase difference with respect to the current I is 0°.

The frequency following controlling portion 11 can determine whether the operation state of the series resonant circuit 4 is in the inductive region or in the capacitive region (i.e., whether the current waveform of the series resonant circuit 4 lags or leads the output waveform of the inverter circuit 3), in the following manner. As shown in FIGS. 3(a) to 3(f), when the signal S3 is at the low (L) level when the signal S4 rises to the high (H) level, it is determined that the operation state of the series resonant circuit 4 is in the inductive region. Furthermore, it is determined that, the operation state more deeply enters the inductive region as the zone T3 where the signal S3 is at the L level in the half period T1 where the signal S4 is at the H level is longer. Also in the case where the signal S3 is at the H level when the signal S4 falls to the L level, it is determined that the operation state of the series resonant circuit 4 is in the inductive region. Furthermore, it is determined that the operation state more deeply enters the inductive region as the zone T4 where the signal S3 is at the H level in the half period T2 where the signal S4 is at the L level is longer.

As shown in FIGS. 4(a) to 4(f), when the signal S3 is at the H level when the signal S4 rises to the H level, it is determined that the operation state of the series resonant circuit 4 is in the capacitive region. Furthermore, it is determined that, the operation state more deeply enters the capacitive region as the zone T5 where the signal S3 is at the L level in the half period T1 where the signal S4 is at the H level is longer. Also in the case where the signal S3 is at the L level when the signal S4 falls to the L level, it is determined that the operation state of the series resonant circuit 4 is in the capacitive region. Furthermore, it is determined that the operation state more deeply enters the capacitive region as the zone T6 where the signal S3 is at the H level in the half period T2 where the signal S4 is at the L level is longer.

In the case where the frequency following controlling portion 11 determines that the operation state of the series resonant circuit 4 is in the inductive region, the frequency following controlling portion increases the voltage level of the control signal S1, and lowers the driving frequency of the bridge driver 6, thereby causing the phase difference between the output voltage Vout of the inverter circuit 3 and the current I of the series resonant circuit 4 to approach zero. In the case where the frequency following controlling portion 11 determines that the operation state of the series resonant circuit 4 is in the capacitive region, the frequency following controlling portion decreases the voltage level of the control signal S1, and raises the driving frequency of the bridge driver 6, thereby causing the phase difference between the output voltage Vout of the inverter circuit 3 and the current I of the series resonant circuit 4 to approach zero. In this way, the frequency following controlling portion 11 produces the control signal S1 so that the phase difference between the output voltage Vout of the inverter circuit 3 and the current I of the series resonant circuit 4 approaches zero, whereby the driving frequency of the bridge driver 6 is caused to follow the series resonant frequency. The configuration and operation of the frequency following controlling portion 11 will be described later in more detail.

Figure 6:
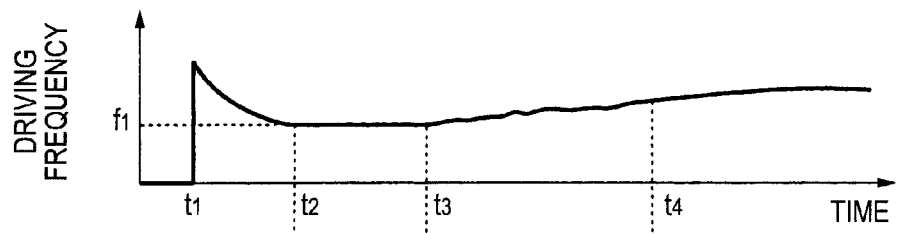
FIGS. 6(a) to 6(d) are graphs showing transitions of a driving frequency of a bridge driver, a voltage of a starting capacitor, and a lamp voltage, respectively, of the discharge lamp lighting circuit of FIG. 1.
Figure 6:
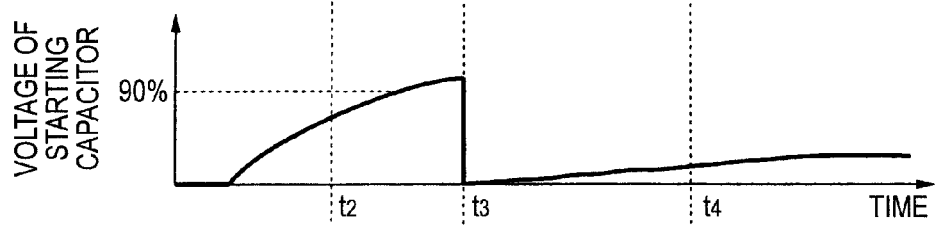
Figure 6:
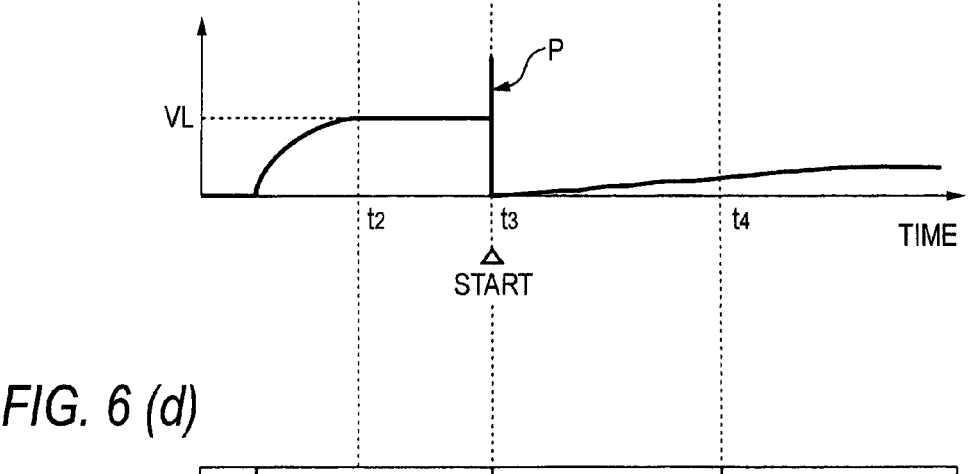
Figure 6:
Figure 8:
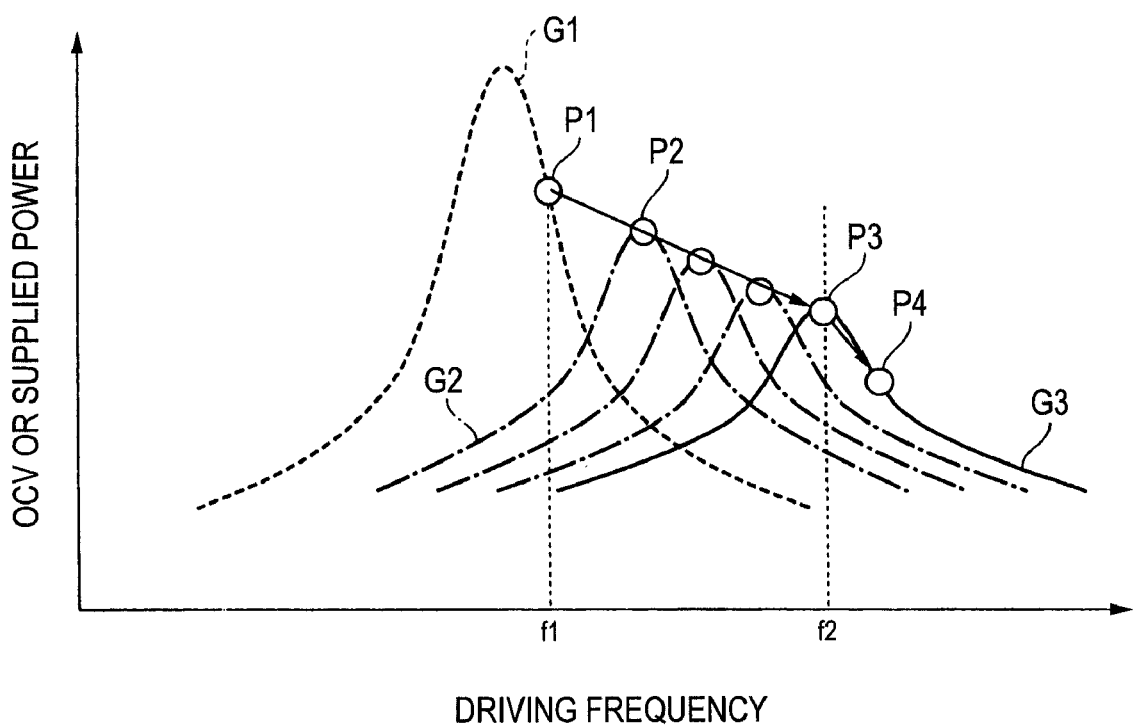
FIG. 8 is a graph showing transition of relationships between the driving frequency of the series resonant circuit and the supplied power of the discharge lamp lighting circuit of FIG. 1.

Now, the operation of the discharge lamp lighting circuit 1, shown in FIG. 1, will be described with reference to FIGS. 6(a)-6(d), FIGS. 7(a)-7(c) and FIG. 8. FIG. 6(a) shows the driving frequency of the bridge driver 6, FIG. 6(b) shows the voltage of the starting capacitor 51, and FIG. 6(c) shows the lamp voltage VL. FIG. 7(a) shows the control signal $Sc_1$ and FIG. 7(b) shows the supplied power. Furthermore, FIG. 6(d) and FIG. 7(c) show transitions of the control mode of the controlling portion 10. FIG. 8 is a graph showing relationships between the driving frequency of the series resonant circuit 4 and the level of the supplied power (or the OCV).

When the discharge lamp lighting circuit 1, shown in FIG. 1, is first powered on (time $t_1$), the driving frequency rises to the maximum value as shown in FIG. 6(a). At this time, in the controlling portion 10, the control signal S2 from the power controlling portion 12 is selected and output as the control signal $Sc_1$. The driving frequency is controlled by the control signal $Sc_1$ to be converged to a value $f_1$ at time $t_2$ (OCV control mode). The value $f_1$ may be predetermined. The relationships between the driving frequency of the series resonant circuit 4 and the supplied power before lighting are indicated by graph G1 shown in FIG. 8. The OCV according to the operating point P1 corresponding to the driving frequency $f_1$ is applied to the discharge lamp L. The OCV may be predetermined. During this period, the charging of the starting capacitor 51 of the starting portion 5 is started.

Thereafter, the voltage across the starting capacitor 51 reaches a threshold value (which may be predetermined), and the self-breakdown switching element 52 is turned on (the time $t_3$ in FIG. 6(b)). As shown in FIG. 6(c), then the starting portion 5 applies the high-voltage pulse P to the discharge lamp L. At this time, a discharge between the electrodes of the discharge lamp L is started to set the conductive state, and the lamp voltage VL is lowered. In the controlling portion 10, the switch 131 is switched so that the frequency following controlling portion 11 begins to supply the control signal S1. The control signal S1 is output as the control signal $Sc_1$ from the controlling portion 10. When the conductive state is set between the electrodes of the discharge lamp L, the relationships shown in FIG. 8 between the driving frequency of the series resonant circuit 4 and the supplied power are transferred to the graph G2.

Namely, because of the conductive state due to the start of a discharge in the discharge lamp L, the resonant frequency of the series resonant circuit 4 becomes higher than the frequency $f_1$, and thereafter is continuously transferred from the lower frequency to a higher frequency $f_2$ as shown in FIG. 8. In other words, the correlation graph G2 of the driving frequency and the supplied power after lighting is continuously moved from the low frequency side to the graph G3 on the high frequency side. The frequency following controlling portion 11 supplies the control signal S1 so that the driving frequency follows the change of the resonant frequency. Therefore, the operating point is transferred from P1 corresponding to the frequency $f_1$ to P3 corresponding to the frequency $f_2$ while following the series resonant frequency which is transferred to the high frequency side (frequency following control mode).

After elapse of a time period of several milliseconds (the time period may be predetermined) from application of the high-voltage pulse to the discharge lamp L (time $t_4$), the switch 131 of the controlling portion 10 is again switched so that the control signal S2 output from the power controlling portion 12 is again output as the control signal $Sc_1$ (power control mode). Thereafter, the power controlling portion 12 produces the control signal $Sc_1$ so that the level of the power to be supplied to the discharge lamp L becomes close to the steady-state value, and, as shown in FIG. 8, the operating point is stabilized at the steady point P4 in the inductive region.

Hereinafter, a specific configuration example and operation of the frequency following controlling portion 11, and first and second signal producing portion 14, 15 according to an exemplary embodiment of the present invention will be described.

Figure 9:
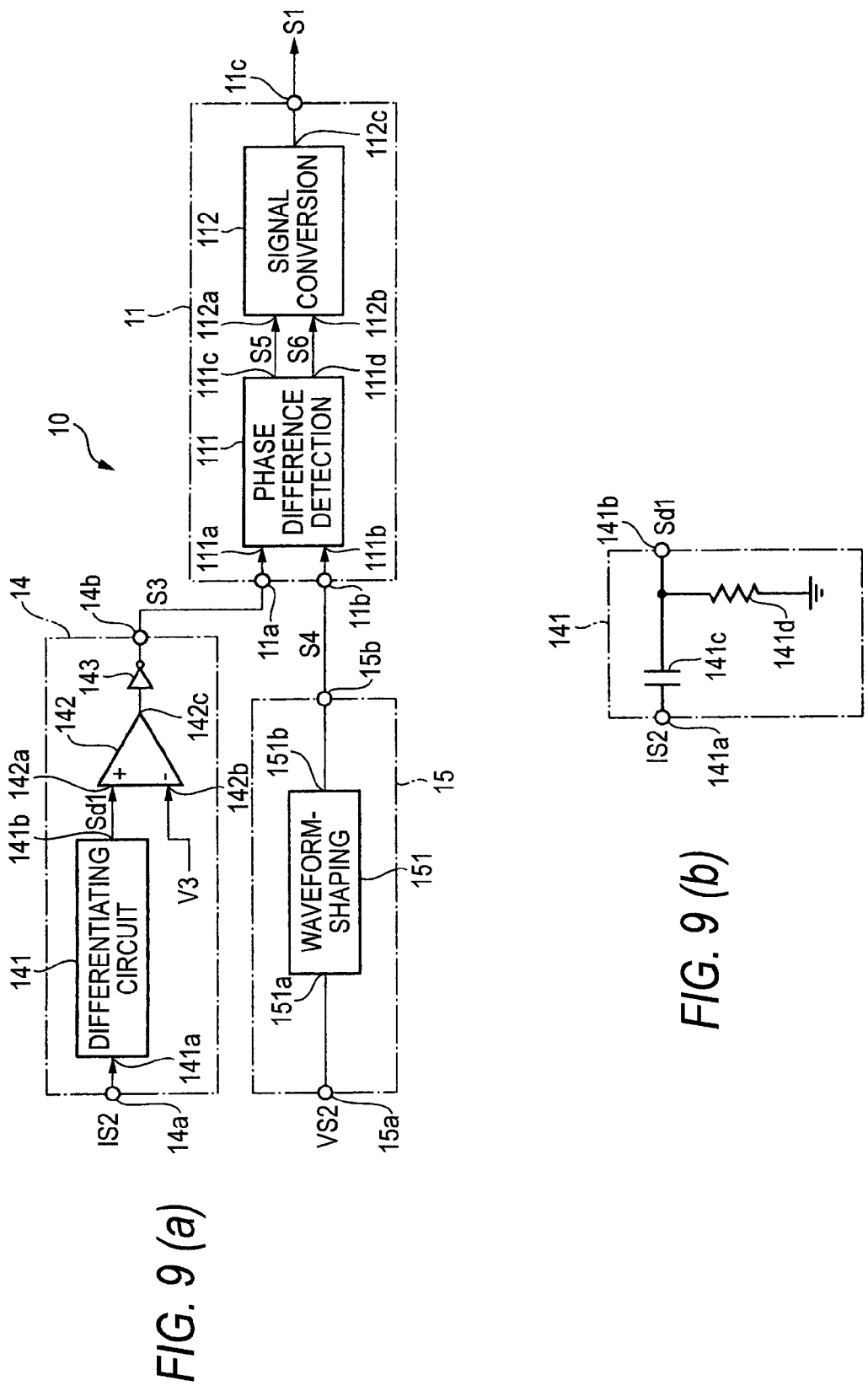
FIG. 9(a) is a block diagram showing an example of internal configurations of a frequency following controlling portion, and first and second signal producing portions according to an exemplary embodiment of the present invention.
FIG. 9(b) is a view showing an example of a circuit configuration of a differentiating circuit according to an exemplary embodiment of the present invention.

FIG. 9(a) shows a block diagram showing an example of the internal configurations of the frequency following controlling portion 11, and the first and second signal producing portions 14, 15. As shown in FIG. 9(a), the frequency following controlling portion 11 in this exemplary embodiment comprises a phase difference detecting portion 111 and a signal converting portion 112. The first signal producing portion 14 comprises a differentiating circuit 141 and a comparator 142. The second signal producing portion 15 comprises a waveform-shaping circuit 151.

An input end 141a of the differentiating circuit 141 is coupled to the input end 10c (see FIG. 2) of the controlling portion 10 via the input end 14a of the first signal producing portion 14, and the signal IS2 is supplied to the input end 141a. An output end 141b of the differentiating circuit 141 is coupled to one input end 142a of the comparator 142, and the differentiating circuit 141 supplies a signal Sd1 which is obtained by differentiating the signal IS2, to the comparator 142. The differentiating circuit 141 is realized by a circuit configuration such as shown in FIG. 9(b). The differentiating circuit 141 shown in FIG. 9(b) has a capacitor 141c and a resistor element 141d. One end of the capacitor 141c is coupled to the input end 141a, and the other end is coupled to the output end 141b. The other end of the capacitor 141c is coupled also to the ground potential via the resistor 141d.

The comparator 142 is the converting circuit in this exemplary embodiment, and converts the output signal Sd1 of the differentiating circuit 141 to a digital signal. A threshold voltage V3 is supplied to the other input end 142b of the comparator 142. The threshold voltage may be predetermined. When the signal Sd1 supplied to one input end 142a is larger than the threshold voltage V3, the comparator 142 outputs the H level, and, when the signal Sd1 is smaller than the threshold voltage V3, the comparator 142 outputs the L level. An output end 142c of the comparator 142 is coupled to the input end 11a of the frequency following controlling portion 11 via an inverter (i.e., a NOT circuit) 143 and the output end 14b of the first signal producing portion 14, and an output of the NOT circuit 143 is provided as the signal S3 to the frequency following controlling portion 11.

The waveform-shaping circuit 151 is a circuit which waveform-shapes the signal VS2 to a rectangular waveform to digitize the signal. An input end 151a of the waveform-shaping circuit 151 is coupled to the input end 10d (see FIG. 2) of the controlling portion 10 via the input end 15a of the second signal producing portion 15, and the signal VS2 is supplied to the input end 151a. An output end 151b of the waveform-shaping circuit 151 is coupled to the input end 11b of the frequency following controlling portion 11 via the output end 15b of the second signal producing portion 15, and the waveform-shaping circuit 151 supplies the signal S4 which is obtained by waveform-shaping the signal VS2, to the frequency following controlling portion 11. For example, the waveform-shaping circuit 151 may be realized by a clamp circuit and a comparator.

As described above, the signals S3, S4 are supplied to input ends 111a, 111b of the phase difference detecting portion 111, respectively. When the phase of the signal S3 lags that of the signal S4, the phase difference detecting portion 111 produces an inductive detection signal S5 having a pulse width corresponding to the phase difference (i.e., the width of the zone T3 or T4 shown in FIGS. 3(a) to 3(f)). When the phase of the signal S3 leads that of the signal S4, the phase difference detecting portion 111 produces a capacitive detection signal S6 having a pulse width corresponding to the phase difference (i.e., the width of the zone T5 or T6 shown in FIGS. 4(a) to 4(f)). The inductive detection signal S5 indicates that the operation state of the series resonant circuit 4 is in the inductive region, and the capacitive detection signal S6 indicates that the operation state of the series resonant circuit 4 is in the capacitive region. The inductive detection signal S5 is supplied from an output end 111c of the phase difference detecting portion 111 to an input end 112a of the signal converting portion 112, and the capacitive detection signal S6 is supplied from an output end 111d of the phase difference detecting portion 111 to an input end 112b of the signal converting portion 112.

The signal converting portion 112 produces the control signal S1 on the basis of the inductive detection signal S5 and the capacitive detection signal S6. When the inductive detection signal S5 having a certain pulse width is input, the signal converting portion 112 raises the voltage level of the control signal S1, and, when the capacitive detection signal S6 having a certain pulse width is input, lowers the voltage level of the control signal S1. An output end 112c of the signal converting portion 112 is coupled to the selecting portion 13 (see FIG. 2) via the output end 11c of the frequency following controlling portion 11, and the control signal S1 is supplied to the selecting portion 13.

The effects of the above-described discharge lamp lighting circuit according to an exemplary embodiment of the present invention will now be described. In the discharge lamp lighting circuit 1, the controlling portion 10 which controls the driving frequency of the inverter circuit 3 comprises the first signal producing portion 14 for detecting the phase of the current I flowing through the series resonant circuit 4; and the second signal producing portion 15 for detecting the phase of the output voltage (AC voltage) Vout supplied from the inverter circuit 3. The controlling portion 10 controls the driving frequency on the basis of the phase difference between the current I flowing through the series resonant circuit 4 and the voltage Vout. According to this exemplary configuration, it is possible to operate the above-described frequency following control mode (i.e., a mode in which the driving frequency is controlled so that the phase difference between the voltage Vout and the current I approaches zero, and the driving frequency of the inverter circuit 3 is made coincident with the resonant frequency of the series resonant circuit 4, so that the maximum power of the series resonant circuit 4 is supplied to the discharge lamp L).

Figure 10:
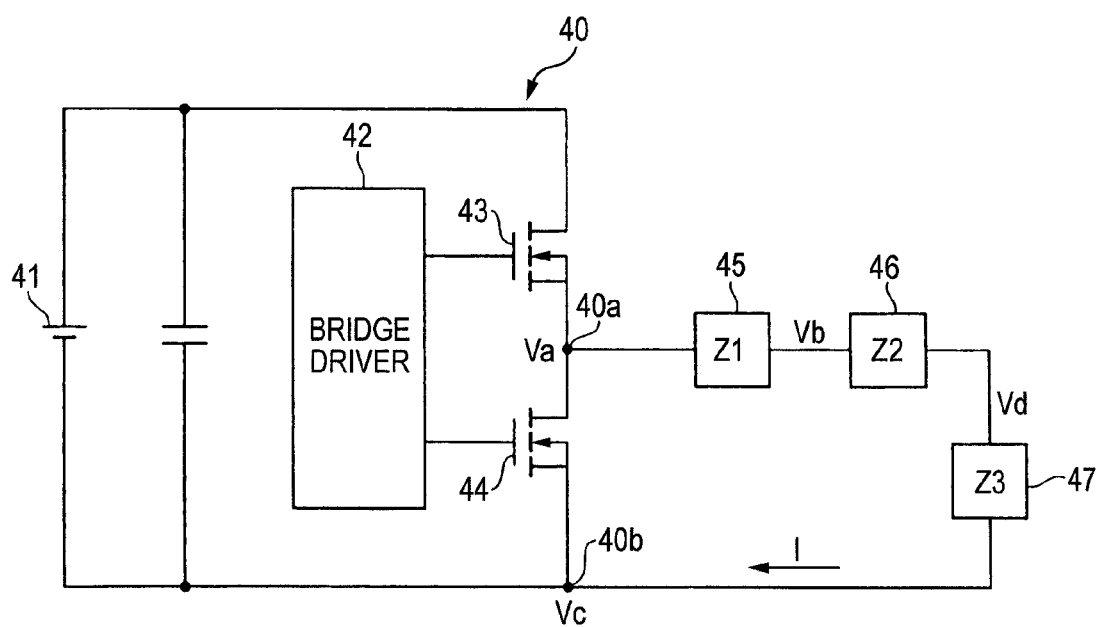
FIG. 10 is a view diagrammatically showing a configuration of a discharge lamp lighting circuit according to an exemplary embodiment of the present invention.

In the discharge lamp lighting circuit 1 of this exemplary embodiment, among the inductor 9, the transformer 7, and the capacitor 8, only the capacitor 8 is coupled between the detection point 4a coupled to the first signal producing portion 14 and the output end 3a of the inverter circuit 3. FIG. 10 is a view diagrammatically showing a configuration of a discharge lamp lighting circuit according to an exemplary embodiment of the present invention. In FIG. 10, a DC power source 41, a bridge driver 42, and an inverter circuit 40 (transistors 43, 44) are configured in the same manner as the DC power source B, the bridge driver 6, and the inverter circuit 3 (transistors 31, 32 in above-described exemplary embodiment). The blocks 45, 46, 47 are an inductor, a transformer, and a capacitor, respectively, and are coupled in series in this sequence between the output ends 40a, 40b of the inverter circuit 40. It is assumed that the impedances of the blocks 45, 46, 47 are Z1, Z2, and Z3, respectively.

When the voltage of the output end 40a of the inverter circuit is indicated by Va, and the voltage at a position after the block 45 is coupled is indicated by Vb, the relationship between the voltages Va and Vb is expressed by following Expression (11). In Expression (11), I denotes the current flowing through the blocks 45, 46, 47.

[Exp. 11]

$$Vb = Va - Z1 \cdot I \quad (11)$$

In Expression (11), the potential Va denotes the output of the inverter circuit 40, and any one of the power source voltage and the grounding potential. According to Expression (11), therefore, the value of the current I can be obtained from that of the voltage Vb. In other words, the phase of the current I can be known by detecting the voltage Vb in the series resonant circuit.

In the discharge lamp lighting circuit this exemplary embodiment, the capacitor 8 is placed at the position of the block 45. As shown in FIGS. 3(f) and 4(f), therefore, the phase of the current I can be obtained by referring to the voltage Vb, i.e., the voltage signal IS2 at the detection point 4a in the series resonant circuit 4. Accordingly, a transformer or resistor for detecting a current is not required in the series resonant circuit 4, and the phase of the current I of the series resonant circuit 4 can be accurately detected even in a state where the discharge lamp L is not lighted, or an arc discharge has not yet occurred.

Alternatively, the circuit element which is placed at the position of the block 45 may be an element other than the capacitor, for example the inductor or the primary winding of the transformer. When one of these circuit elements is placed at the position of the block 45, the phase of the current I of the series resonant circuit 4 can also be detected.

The detection point to which the first signal producing portion 14 is coupled is not restricted to the detection point 4a in the above-described exemplary embodiment, and the detection point may alternatively be located between the inductor 9 and the primary winding 7a of the transformer 7. In FIG. 10, the voltage Vc of the output end 40b of the inverter circuit 40 is 0 (the grounding potential). When the voltage of the position at an output end of the block 47 is indicated by Vd, therefore, the voltage Vd is expressed by following Expression (12).

[Exp. 12]

$$Vd = Z3 \cdot I \quad (12)$$

According to Expression (12), the value of the current I can be obtained from that of the voltage Vd. In other words, the phase of the current I can be known by detecting the voltage Vd in the series resonant circuit. In this exemplary embodiment, the primary winding 7a of the transformer 7 is placed at the position of the block 47. Therefore, the phase of the current I of the series resonant circuit 4 can also be detected by referring to the voltage Vd, i.e., the voltage between the inductor 9 and the primary winding 7a of the transformer 7. In this case, the circuit element which is placed at the position of the block 47 may be an element other than the transformer, for example the capacitor or the inductor.

In the above-described exemplary embodiment, the element which is placed between the output end 3a (or 3b) of the inverter circuit 3 and the detection point (4a in this exemplary embodiment) is a capacitor. Usually, an inverter circuit is configured by a transistor, and an element which is of the surface mount type and which has a small size is often used as the transistor. Similarly, a capacitor which is of the surface mount type and which is relatively smaller than an inductor and a transformer can be used. When a capacitor is disposed in place of an inductor or a transformer between the detection point 4a to which the first signal producing portion 14 is coupled and the output end 3a of the inverter circuit 3, therefore, the current path of the series resonant circuit 4 can be shortened, and the high-frequency characteristic of the series resonant circuit 4 can be stabilized. Furthermore, the transistors 31, 32 and capacitor 8 which are small in size can be disposed close to each other, so that the space on a circuit board can be efficiently used.

As shown in FIGS. 9(a) and 9(b), the first signal producing portion 14 comprises the differentiating circuit 141 which differentiates the voltage signal IS2 at the detection point 4a; and the converting circuit (the comparator 142) which converts the output signal Sd1 of the differentiating circuit 141 to a digital signal. In the discharge lamp lighting circuit 1 of this exemplary embodiment, the capacitor 8 is coupled between the output end 3a of the inverter circuit 3 and the detection point 4a, and hence the phase of the voltage signal IS2 at the detection point 4a leads by about 90° the phase of the current I. Also in the case where the driving frequency is controlled so that the phase difference between the voltage Vout and the current I approaches zero, and the driving frequency of the inverter circuit 3 is made coincident with the resonant frequency of the series resonant circuit 4, the phase of the voltage signal IS2 leads by about 90° the current I. In these cases, when the voltage signal IS2 at the detection point 4a is differentiated, the phase difference between the differentiated voltage signal IS2 and the current I is about 180°, or the waveform of the differentiated voltage signal IS2 is an inversion of that of the current I. Therefore, the phase difference can be made about 0° by a simple circuit such as the NOT circuit 143 (see FIGS. 3(f) and 4(f)), and hence the phase difference between the voltage signal IS2 after converted to a digital signal, and the current I can be easily processed.

(First Modification)

FIGS. 11(a) and 11(b) show a block diagram of another exemplary embodiment of the present invention. FIG. 11(a) shows an example of the internal configurations of the frequency following controlling portion 11, a first signal producing portion 16, and the second signal producing portion 15. The configurations of the frequency following controlling portion 11 and the second signal producing portion 15 are the same as those of the exemplary embodiment described above, and hence their detailed description is omitted.

The first signal producing portion 16 comprises an integrating circuit 161 and an comparator 162. The signal IS2 is supplied to an input end 161a of the integrating circuit 161 via an input end 16a of the first signal producing portion 16. An output end 161b of the integrating circuit 161 is coupled to one input end 162a of the comparator 162, and the integrating circuit 161 supplies a signal Si1 which is obtained by integrating the signal IS2, to the comparator 162. For example, the integrating circuit 161 is realized by a circuit configuration such as shown in FIG. 11(b). The integrating circuit 161 shown in FIG. 11(b) has a resistor element 161c and a capacitor 161d. One end of the resistor element 161c is coupled to the input end 161a, and the other end is coupled to the output end 161b. The other end of the resistor element 161c is coupled also to the ground potential via the capacitor 161d.

The comparator 162 is the converting circuit, and converts the output signal Si1 of the integrating circuit 161 to a digital signal. The threshold voltage V3 (which may be predetermined) is supplied to the other input end 162b of the comparator 162. When the signal Si1 supplied to the one input end 162a is larger than the threshold voltage V3, the comparator 162 outputs the signal S3 of the H level, and, when the signal Si1 is smaller than the threshold voltage V3, the comparator 162 outputs the signal S3 of the L level. An output end 162c of the comparator 162 is coupled to the input end 11a of the frequency following controlling portion 11 via the output end 16b of the first signal producing portion 16, and the signal S3 is provided to the frequency following controlling portion 11.

The first signal producing portion 16 comprises the integrating circuit 161 which integrates the voltage signal IS2 at the detection point 4a; and the converting circuit (the comparator 162) which converts the output signal Si1 of the integrating circuit 161 to the digital signal S3. As described above, the phase of the voltage signal IS2 at the detection point 4a leads by about 90° the current I. When the voltage signal IS2 at the detection point 4a is integrated as in the modification, the phase difference between the integrated voltage signal IS2 and the current I is about 0°. Therefore, the phase difference between the voltage signal IS2 after converted to a digital signal, and the current I can be easily processed.

(Second Modification)

FIGS. 12(a) and 12(b) are block diagrams of yet another exemplary embodiment of the present invention. FIG. 12(a) shows an example of the internal configurations of the frequency following controlling portion 11, a first signal producing portion 17, and the second signal producing portion 15. The configurations of the frequency following controlling portion 11 and the second signal producing portion 15 are the same as those of the exemplary embodiment described above and will therefore be omitted.

The first signal producing portion 17 comprises an integrating circuit 171, a differentiating circuit 172, and an comparator 173. The integrating circuit 171 is the first circuit which performs integration on the signal IS2. The signal IS2 is supplied to an input end 171a of the integrating circuit 171 via an input end 17a of the first signal producing portion 17. An output end 171b of the integrating circuit 171 is coupled to an input end 172a of the differentiating circuit 172. The integrating circuit 171 supplies a signal Si2 which is obtained by integrating the signal IS2, to the differentiating circuit 172. The differentiating circuit 172 is the second circuit which performs differentiation on the output signal Si2 of the integrating circuit 171. An output end 172b of the differentiating circuit 172 is coupled to one input end 173a of the comparator 173, and the differentiating circuit 172 supplies a signal Sd2 which is obtained by differentiating the signal Si2, to the comparator 173. For example, the integrating circuit 171 and the differentiating circuit 172 may be realized by a circuit configuration such as shown in FIG. 12(b). The integrating circuit 171 shown in FIG. 12(b) has a resistor element 171c and a capacitor 171d. The connection relationship of the circuit is the same as the integrating circuit 161 in FIG. 11(b) described above. The differentiating circuit 172 has a capacitor 172c and a resistance element 172d. The connection relationship of the circuit is the same as that of the differentiating circuit 141 shown in FIG. 9(b) described above. The output end 172b of the differentiating circuit 172 is clamped by a diode 174.

The comparator 173 is the converting circuit, and converts the output signal Sd2 of the differentiating circuit 172 to a digital signal. The threshold voltage V3 (which may be predetermined) is supplied to another input end 173b of the comparator 173. When the signal Sd2 supplied to the one input end 173a is larger than the threshold voltage V3, the comparator 173 outputs the signal S3 of the H level, and, when the signal Sd2 is smaller than the threshold voltage V3, the comparator 173 outputs the signal S3 of the L level. An output end 173c of the comparator 173 is coupled to the input end 11a of the frequency following controlling portion 11 via the output end 17b of the first signal producing portion 17, and the signal S3 is provided to the frequency following controlling portion 11.

In the case where the signal IS2 is differentiated by the differentiating circuit 141, the differentiating circuit cuts the DC component of the input signal, and hence detection of a zero cross of the signal IS2 is highly accurate. When the signal IS2 contains high-frequency noise, however, the differentiating circuit tends to allow the noise components to pass therethrough because the gain is higher as the frequency is higher, and hence erroneous detection may be caused. By contrast, in the case where the signal IS2 is integrated by the integrating circuit 161 as in the first modification, when the input signal contains high-frequency noise, the integrating circuit cuts the noise components, and the S/N ratio of the signal IS2 can be improved. In order to realize a phase lag, however, the gain is excessively lowered, and there is a possibility that a signal cannot be detected. When the integrating circuit 171 and the differentiating circuit 172 are combined with each other and the circuits are set to respective adequate cutoff frequencies, the S/N ratio can be improved while the accuracy of detection of a zero crossing of the signal IS2 is enhanced. In another exemplary embodiment of the present invention, the differentiating circuit may be placed in the preceding stage of the integrating circuit. In this case, the differentiating circuit is the first circuit which performs differentiation on the signal IS2, and the integrating circuit is the second circuit which performs integration on an output signal of the differentiating circuit.

(Third Modification)

Figure 13:
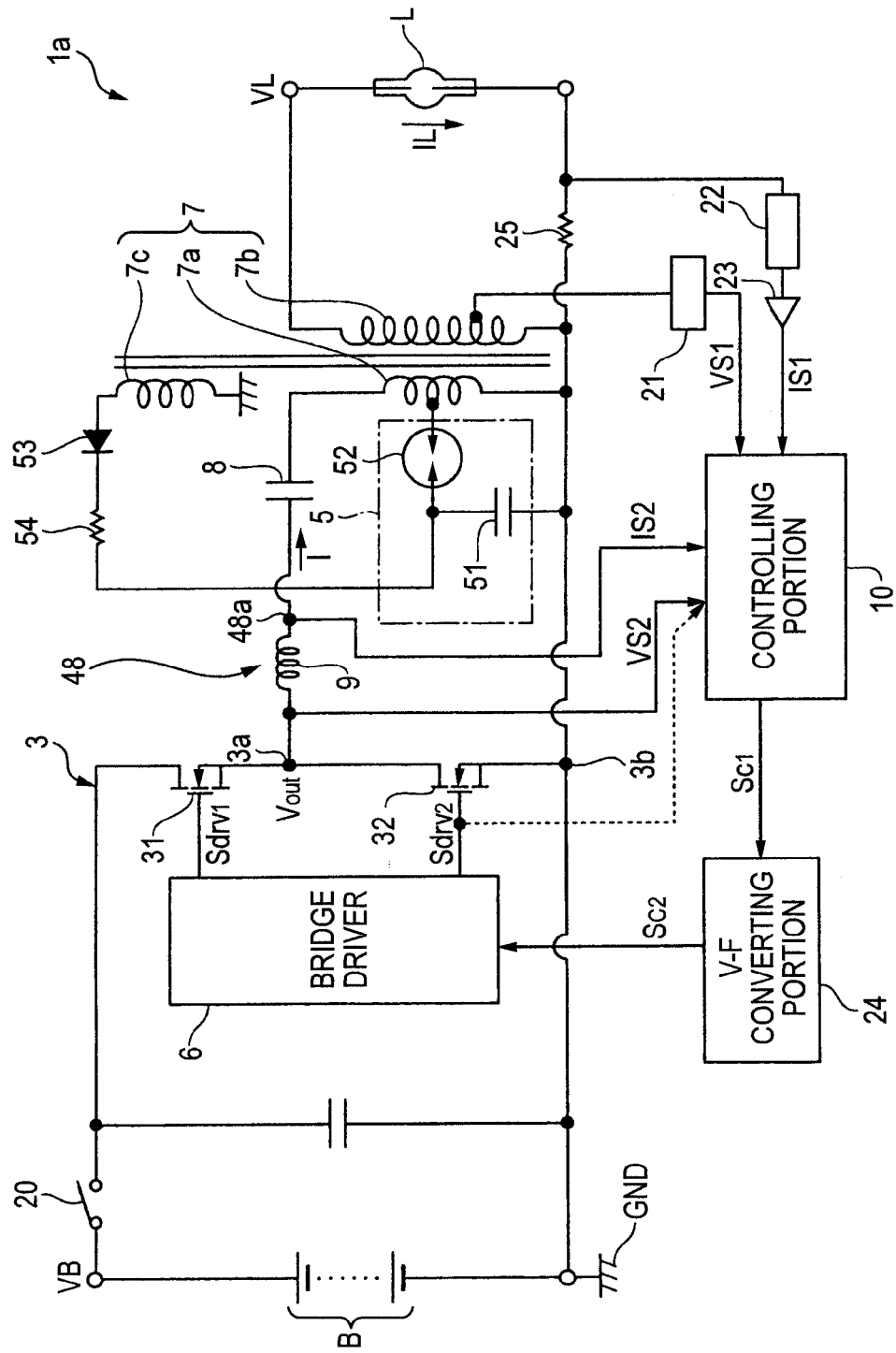
FIG. 13 is a view showing a discharge lamp lighting circuit according to another exemplary embodiment of the present invention.

FIG. 13 is a block diagram showing a discharge lamp lighting circuit according to yet another exemplary embodiment of the present invention. FIG. 13 shows a discharge lamp lighting circuit 1a which is different from above-described exemplary embodiments in that the placement of the capacitor and the inductor is different. In the discharge lamp lighting circuit 1a, the inductor 9, the capacitor 8, and the primary winding 7a of the transformer 7 of a series resonant circuit 48 are coupled in series in this sequence. One end of the series circuit on the side of the inductor 9 is coupled to the one output end 3a of the inverter circuit 3, and the other end on the side of the primary winding 7a is coupled to the other output end 3b of the inverter circuit 3.

A detection point 48a for referring to the signal IS2 is set between the inductor 9 and the capacitor 8. In other words, among the inductor 9, the transformer 7, and the capacitor 8, the inductor 9 is coupled between the detection point 48a and the output end 3a of the inverter circuit 3.

The inductor 9 is placed at the position of the block 45 in the diagram of FIG. 10, and the phase of the current I is detected by referring to the voltage Vb. The circuit element which is placed at the position of the block 45 may be the inductor. Although not illustrated, alternatively, the circuit element may be the primary winding of the transformer. When one of these circuit elements is placed at the position of the block 45, the phase of the current I of the series resonant circuit 48 can be detected.

(Fourth Modification)

Figure 14:
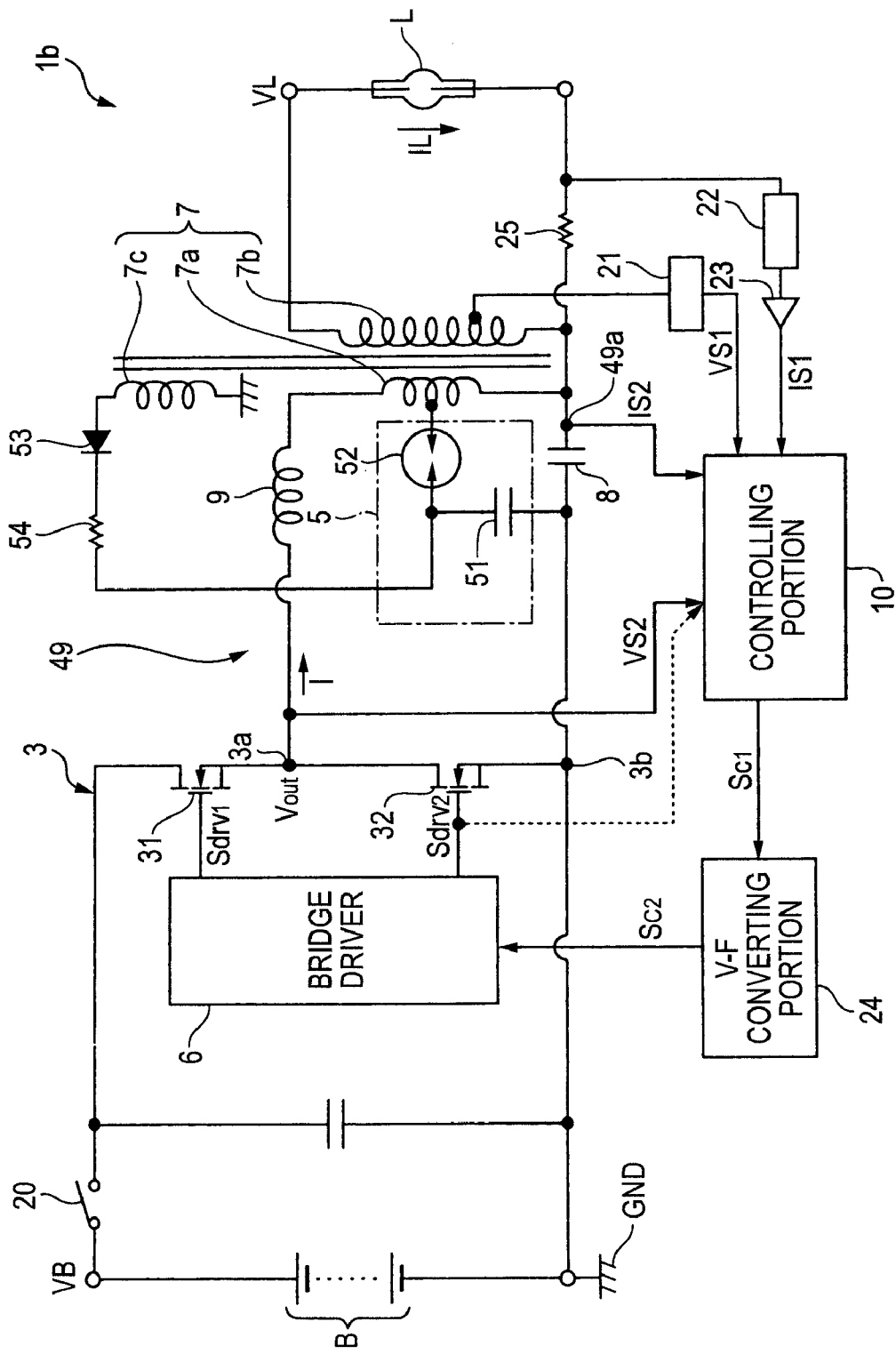
FIG. 14 is a view showing a discharge lamp lighting circuit according to yet another exemplary embodiment of the present invention.

FIG. 14 is a block diagram showing a configuration of a discharge lamp lighting circuit according to yet another exemplary embodiment of the present invention. A discharge lamp lighting circuit 1b is different from the above-described exemplary embodiments in the placement of the capacitor and the position of the detection point. In the discharge lamp lighting circuit 1b, the inductor 9, the primary winding 7a of the transformer 7, and the capacitor 8 of a series resonant circuit 49 are coupled in series in this sequence. One end of the series circuit on the side of the inductor 9 is coupled to the one output end 3a of the inverter circuit 3, and the one end on the side of the capacitor 8 is coupled to the other output end 3b of the inverter circuit 3. A detection point 49a for referring to the signal IS2 is set between the primary winding 7a and the capacitor 8. In other words, among the inductor 9, the transformer 7, and the capacitor 8, the capacitor 8 is coupled between the detection point 49a and the output end 3b of the inverter circuit 3.

The capacitor 8 is placed at the position of the block 47 in the diagram of FIG. 10, and the phase of the current I is detected by referring to the voltage Vd. The circuit element which is placed at the position of the block 47 may be the inductor or the primary winding of the transformer. When one of these circuit elements is placed at the position of the block 47 and the voltage Vd (i.e., the voltage at the detection point 49a) is referred to, the phase of the current I of the series resonant circuit 49 can be detected.

What is claimed is:

1. A discharge lamp lighting circuit comprising:
    an inverter circuit which has two output ends, and which outputs an AC voltage between said two output ends;
    a series resonant circuit which comprises a capacitor, at least one inductor and at least one transformer, and which supplies AC power to said discharge lamp, wherein said capacitor, said at least one inductor and said at least one transformer are coupled in series between said two output ends of said inverter circuit;
    a driving portion which drives said inverter circuit; and
    a controlling portion which provides said driving portion with a control signal for controlling said inverter circuit, said controlling portion comprising:
        a first signal producing portion which produces a first signal indicative of a phase of a current flowing through said series resonant circuit based on a voltage at a detection point in said series resonant circuit; and
        a second signal producing portion which produces a second signal indicative of a phase of the AC voltage output from said inverter circuit,
        said controlling portion producing the control signal on the basis of a phase difference between the first and second signals,
    wherein one component of said inductor, said transformer, and said capacitor which comprise the series resonant circuit, is coupled between one of said two output ends, and said detection point.

2. A discharge lamp lighting circuit according to claim 1, wherein said one component is said capacitor.

3. A discharge lamp lighting circuit according to claim 1, wherein said one component is said at least one inductor.

4. A discharge lamp lighting circuit according to claim 1, wherein said first signal producing portion comprises:
    a differentiating circuit which differentiates a voltage at said detection point; and
    a converting circuit which converts an output of said differentiating circuit to a digital signal.

5. A discharge lamp lighting circuit according to claim 1, wherein said first signal producing portion comprises:
    an integrating circuit which integrates a voltage at said detection point; and
    a converting circuit which converts an output of said integrating circuit to a digital signal.

6. A discharge lamp lighting circuit according to claim 1, wherein said first signal producing portion comprises:
    a first circuit which performs one of integration and differentiation on a voltage at said detection point;
    a second circuit which performs one of integration and differentiation not performed by the first circuit on an output of said first circuit; and
    a converting circuit which converts an output of said second circuit to a digital signal.

7. A discharge lamp lighting circuit comprising:
    an inverter circuit which has two output ends;
    a series resonant circuit which comprises at least three components, said at least three components coupled together in series between said two output ends of said inverter circuit;
    a driving portion which drives said inverter circuit; and
    a controlling portion which provides said driving portion with a control signal for controlling said inverter circuit, said control signal generated based on a difference between a phase of a current based on a voltage at a detection point in said series resonant circuit and a phase of an AC voltage output from said inverter circuit.

8. A discharge lamp lighting circuit according to claim 7, wherein said detection point is located at an end of one component of said at least three components which is opposite to an end of the one of said at least three components which is coupled to said inverter circuit.

9. A discharge lamp lighting circuit according to claim 8, wherein said one component is said capacitor.

10. A discharge lamp lighting circuit according to claim 8, wherein said one component is said at least one inductor.

11. A discharge lamp lighting circuit according to claim 7, wherein said controlling portion comprises:
    a differentiating circuit which differentiates a voltage at said detection point; and
    a converting circuit which converts an output of said differentiating circuit to a digital signal.

12. A discharge lamp lighting circuit according to claim 7, wherein said controlling portion comprises:
    an integrating circuit which integrates a voltage at said detection point; and
    a converting circuit which converts an output of said integrating circuit to a digital signal.

13. A discharge lamp lighting circuit according to claim 7, wherein said controlling portion comprises:
    a first circuit which performs one of integration and differentiation on a voltage at said detection point;
    a second circuit which performs one of integration and differentiation not performed by the first circuit on an output of said first circuit; and
    a converting circuit which converts an output of said second circuit to a digital signal.

14. A lighting device for a vehicle, comprising:
    a discharge lamp lighting circuit comprising:
        an inverter circuit which has two output ends, and which outputs an AC voltage between said two output ends;
        a series resonant circuit which comprises a capacitor, at least one inductor and at least one transformer, and which supplies AC power to said discharge lamp, wherein said capacitor, said at least one inductor and said at least one transformer are coupled in series between said two output ends of said inverter circuit;
        a driving portion which drives said inverter circuit; and
        a controlling portion which provides said driving portion with a control signal for controlling said inverter circuit,
        said controlling portion comprising:
            a first signal producing portion which produces a first signal indicative of a phase of a current flowing through said series resonant circuit based on a voltage at a detection point in said series resonant circuit; and a second signal producing portion which produces a second signal indicative of a phase of the AC voltage output from said inverter circuit, said controlling portion producing the control signal on the basis of a phase difference between the first and second signals, wherein said capacitor is coupled between one of said two output ends, and said detection point, and wherein said first signal producing portion comprises:

a first circuit which performs one of integration and differentiation on a voltage at said detection point;

a second circuit which performs one of integration and differentiation not performed by the first circuit on an output of said first circuit; and a converting circuit which converts an output of said second circuit to a digital signal.

* * * * *